United States Patent
Yoon

(10) Patent No.: US 7,907,242 B2
(45) Date of Patent: Mar. 15, 2011

(54) LIQUID CRYSTAL DISPLAY DEVICE AND METHOD FOR FABRICATING SAME HAVING SPACER IN ALIGNMENT GROOVE IN WHICH THE GROOVE WIDTH IS GREATER THAN THE SPACER DIAMETER

(75) Inventor: Sung Hoe Yoon, Goyang-si (KR)

(73) Assignee: LG. Display Co., Ltd., Seoul (KR)

( * ) Notice: Subject to any disclaimer, the term of this patent is extended or adjusted under 35 U.S.C. 154(b) by 567 days.

(21) Appl. No.: 11/302,631

(22) Filed: Dec. 14, 2005

(65) Prior Publication Data

US 2006/0238693 A1    Oct. 26, 2006

(30) Foreign Application Priority Data

Apr. 20, 2005   (KR) .................. 10-2005-0032732

(51) Int. Cl.
  *G02F 1/1337*   (2006.01)
(52) U.S. Cl. ......... 349/123; 349/141; 349/155; 349/157
(58) Field of Classification Search .......... 349/123–137, 349/155–157
  See application file for complete search history.

(56) References Cited

U.S. PATENT DOCUMENTS

| | | | |
|---|---|---|---|
| 5,739,882 A | | 4/1998 | Shimizu et al. |
| 5,880,803 A | * | 3/1999 | Tamai et al. .................. 349/156 |
| 6,049,370 A | | 4/2000 | Smith, Jr. et al. |
| 6,266,121 B1 | * | 7/2001 | Shigeta et al. ................ 349/156 |
| 6,299,949 B1 | | 10/2001 | Shioda et al. |
| 6,424,402 B1 | | 7/2002 | Kishimoto |
| 7,130,011 B2 | * | 10/2006 | Hsieh et al. .................. 349/141 |
| 2002/0140893 A1 | | 10/2002 | Yi et al. |
| 2003/0030769 A1 | | 2/2003 | Hong et al. |
| 2004/0125328 A1 | | 7/2004 | Chae et al. |
| 2004/0183991 A1 | | 9/2004 | Kuo |
| 2005/0243262 A1 | | 11/2005 | Kim et al. |

FOREIGN PATENT DOCUMENTS

| | | |
|---|---|---|
| DE | 103 61 375 A1 | 7/2004 |
| JP | 58-037620 | 3/1983 |
| JP | 62-091920 | 4/1987 |
| JP | 03-064736 | 3/1991 |
| JP | 07-287213 | 10/1995 |

(Continued)

OTHER PUBLICATIONS

Combined Search and Examination Report dated Mar. 27, 2006 for corresponding United Kingdom Application No. 0525056.8.

(Continued)

*Primary Examiner* — John Heyman
(74) *Attorney, Agent, or Firm* — Brinks Hofer Gilson & Lione

(57) ABSTRACT

A liquid crystal display device, and a method for fabricating the same is described, in which an alignment film is formed divided into a plurality of sub-alignment films spaced from each other, and a column spacer is formed in the space between the sub-alignment films. The liquid crystal display device includes a first substrate, and a second substrate opposite to each other, a first alignment film on the second substrate, the first alignment film having a first alignment film groove in a predetermined portion, a first spacer in the first alignment film groove, and a liquid crystal layer between the first substrate and the second substrate.

23 Claims, 22 Drawing Sheets

FOREIGN PATENT DOCUMENTS

| | | |
|---|---|---|
| JP | 09-127522 | 5/1997 |
| JP | 2000-155321 | 6/2000 |
| JP | 2000-275654 | 10/2000 |
| JP | 2001-142083 | 5/2001 |
| JP | 2004-252242 | 9/2004 |
| JP | 2005-018062 | 1/2005 |
| TW | 200420991 | 10/2004 |
| WO | WO 86/05283 | 9/1986 |

OTHER PUBLICATIONS

First Office Action issued in Corresponding Chinese Patent Application No. 200510130011.5; issued Mar. 14, 2008.

Office Action issued in corresponding German Patent Application No. 10 2005 060 982.1; issued Nov. 27, 2008.

Office Action issued in corresponding Taiwanese Patent Application No. 094144316; issued Aug. 19, 2009.

* cited by examiner

FIG. 4A
 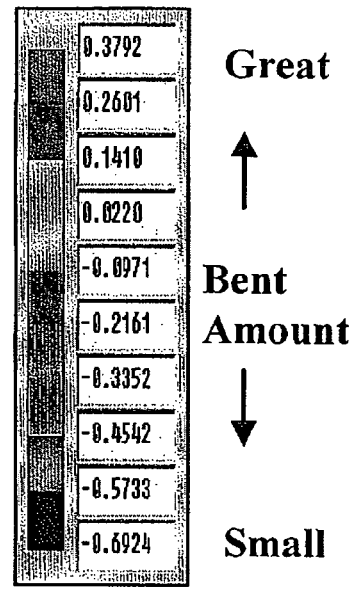
FIG. 4B
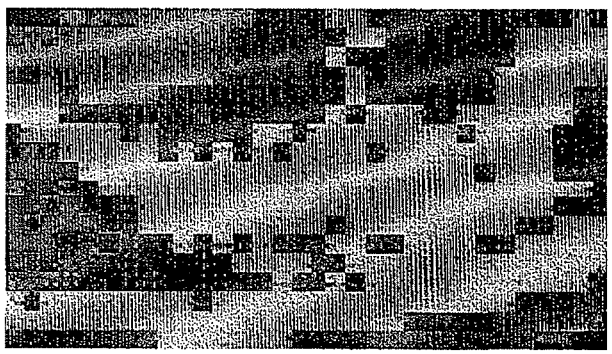 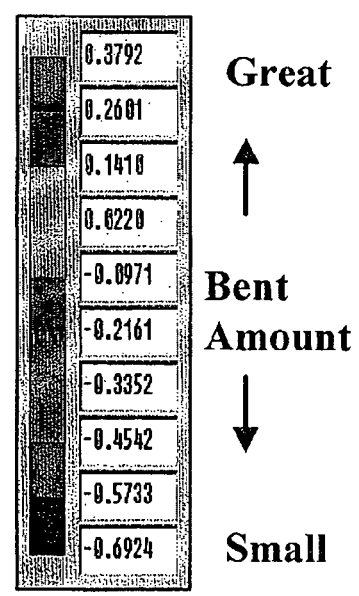

US 7,907,242 B2
1

LIQUID CRYSTAL DISPLAY DEVICE AND METHOD FOR FABRICATING SAME HAVING SPACER IN ALIGNMENT GROOVE IN WHICH THE GROOVE WIDTH IS GREATER THAN THE SPACER DIAMETER

This application claims the benefit of Korean Application No. P2005-32732 filed on Apr. 20, 2005, which is hereby incorporated by reference as if fully set forth herein.

TECHNICAL FIELD

The present application relates to liquid crystal display devices, and more particularly, to a liquid crystal display device, and a method for fabricating the same, in which an alignment film is formed divided into a plurality of sub-alignment films spaced from each other, and a column spacer is formed in the space between the sub-alignment films.

BACKGROUND

Various flat display devices, such as LCD (Liquid Crystal Display Device), PDP (Plasma Display Panel), ELD (Electro Luminescent Display), VFD (Vacuum Fluorescent Display), are used as display devices in various apparatuses.

Of the various display devices replacing the CRT (Cathode Ray Tube), the LCD is often used for mobile display devices owing to advantages of good picture quality, light weight, thin profile, and low power consumption. Besides mobile display devices, such as monitors for notebook computers, the LCD is developed in various forms as monitors for televisions for receiving and displaying a broadcasting signal, and monitors for computers.

For using the LCD as general display devices, one aspect of the of development of the LCD focuses on realization of a high quality picture, such as high definition, high luminance, and large sized picture, while the features of light weight, thin profile, and low power consumption are maintained.

Referring to FIG. 1, the related art liquid crystal display device is provided with a first substrate 1 and a second substrate 2 bonded together with a space between the substrates, and a liquid crystal layer 3 injected between the first substrate 1 and the second substrate 2.

A plurality of gate lines 4 arranged on the first substrate at regular intervals in one direction, and a plurality of data lines 5 at regular intervals perpendicular to the gate lines 4 to define pixel regions 'P', wherein a pixel electrode 6 is formed on each of pixel regions 'P', and a plurality of thin film transistors 'T' are respectively formed at portions where the gate lines 4 and the data lines 5 cross, so as to be switched in response to a signal on the gate line 4 for transmission of a data signal from the data line 5 to each pixel electrode 6.

A black matrix layer 7 is formed on the second substrate 2 for shielding a light incident on portions excluding the pixel regions 'P', the R, G, G color filter layers 8 at portions opposite to the pixel regions respectively for expressing colors, and a common electrode 9 on the color filter layer 8.

The liquid crystal display device can display a picture as the liquid crystal layer 3 is oriented between the first and second substrates 1, and 2 by an electric field between the pixel electrode 6 and the common electrode 9, to regulate a quantity of a light transmit through the liquid crystal layer 3 depending on an extent of orientation of the liquid crystal layer 3.

This type of liquid crystal display device is called as a TN (Twisted Nematic) mode liquid crystal display device. Since the TN mode liquid crystal display device has a drawback of a narrow angle of view, in order to overcome such a drawback, an IPS (In-Plane Switching) mode liquid crystal device has been developed.

The IPS mode liquid crystal device has the pixel electrodes and the common electrodes arranged in parallel at regular intervals for forming an in-plane electric field between the pixel electrodes and the common electrodes, to orient the liquid crystal layer.

Spacers for maintaining a fixed gap of the liquid crystal layer are formed between the first, and second substrate 1, and 2 of the liquid crystal display device.

There are ball spacers and column spacers depending on shapes thereof. The ball spacers are spherical, scattered on the first, and second substrates 1, and 2, move freely even after bonding of the first, and second substrates 1, and 2, and have a smaller contact area with the first, and second substrates 1, and 2. The column spacers are columnar and fixed on the first, or second substrate 1, or 2 and formed in an array step. Accordingly, the column spacer has a greater contact area with the first, and second substrates 1, and 2 than the ball spacer.

The column spacer is mostly used in liquid crystal display devices fabricated by the liquid crystal dispensing method, because of the problems caused when the ball spacer is used in the liquid crystal dispensing method. In the liquid crystal dispending, the ball spacers are scattered before or after dispensing of the liquid crystals and bonding of the first and second substrates. If the spacers are scattered after dispensing of the liquid crystals, the liquid crystal impedes uniform spread of the spacers to proper positions, and if the spacers are scattered before dispensing of the liquid crystals, even if the spacers are scattered uniformly, the dispensing of the liquid crystals disturbs the uniform distribution of the spacers. Moreover, in the latter case, since the liquid crystals are dispensed on a non-uniform spacer scattered surface, fluidity of the liquid crystals is poor. Therefore, in the liquid crystal display device fabricated by the liquid crystal dispensing method, the column spacers are used for maintaining a cell gap between two substrates.

FIG. 2 illustrates a section of a related art IPS mode liquid crystal display device. An IPS mode liquid crystal display device is provided with a thin film transistor array substrate (TFT substrate) 30 having a thin film transistor array formed thereon, a color filter array substrate (CF substrate) 40 having a color filter array formed thereon, a liquid crystal layer 50 filled between the TFT substrate 30 and the CF substrate 40, and column spacers 45 between the TFT substrate 30 and the CF substrate 40.

Although not shown, the TFT substrate 30 includes first substrate having gate lines and data lines arranged thereon perpendicular to each other to define pixel regions, a plurality of TFT respectively formed at portions where the gate lines and the data lines cross, a pixel electrode, and a common electrode formed alternately on each of the pixel regions. Between layers of the gate line and the data line, there is a gate insulating film, and between layers of the data line and the pixel electrode, there is a protective film.

The CF substrate 40 opposite to the TFT substrate 30 includes a second substrate 41, a black matrix layer 42 for covering a non-pixel region (gate lines, data lines, and TFT regions), a color filter layer 43 having R, G, or B pigment formed in a sequence on the second substrate 41, and disposed opposite to the pixel regions, and an overcoat layer 44 formed on an entire surface of the second substrate 41 including the black matrix layer 42 and the color filter layer 43.

On a predetermined region of the overcoat layer 44, the column spacers 45 are formed and an alignment film 46 is formed on a surface of the CF substrate 40 including the column spacers 45 in a cell forming step after an array forming step. Though not shown, an alignment film is also formed on the TFT substrate 30 in an initial step of the cell forming step.

The (IPS mode) liquid crystal display device having column spacers exhibits a luminance non-uniformity in a black state.

Referring to FIG. 3A, if a finger touches subsequently, and sweeps a surface of the TFT substrate 30 or the CF substrate 40] of the liquid crystal panel 10 in a direction, the CF substrate 45 of the liquid crystal panel shifts a distance in the direction the finger sweeps as shown in FIG. 3B. In this instance, however, the liquid crystals 50 between the column spacers 45 fail to return to an original state, such that a touched portion is left as a milky-white spot on the liquid crystal panel 10. Moreover, as shown in FIG. 3B, a swept portion by the finger has less of the liquid crystals 50 while the liquid crystals gather at a final contact portion to form a protruded shape. In this instance, the protruded portion with the liquid crystal gathered thereon has a cell gap h1 higher than a cell gap h2 of other portion that is defined by a height of the column spacer 45, Accordingly, a problem occurs in which a touched portion has a non-uniform luminance compared to other portions, which may cause a leakage of light.

This problem is caused by high friction between an upper surface of the column spacer 45 formed on the CF substrate and the TFT substrate 30. That is, after the CF substrate shifts with respect to the TFT substrate 30, the CF substrate fails to return to an original position immediately and even if the finger is removed from the CF substrate, the leakage of light continues.

The force with which the column spacer 45 in close contact with the TFT substrate 30 pulls the TFT substrate 30 is greater than a force with which the CF substrate tends to return to an original position. In another aspect, the shrinkage or slackening of a polarization plate attached to the liquid crystal panel by change of environmental humidity and temperature pulls the substrate in a direction of deformation to bend the substrate, which disturbs the orientation of the liquid crystals.

Since the touch-related problem can occur by contact, such as wiping of the panel surface of the liquid crystal display device, the non-uniformity of luminance in a black state caused by the touch can occur during fabrication or use of the liquid crystal display device. Moreover, there is a tendency for the non-uniformity of luminance in a black state caused by the touch becomes worse as a size of screen becomes larger. When the size of the screen is large, control of a liquid crystal amount is difficult.

FIG. 4A illustrates a diagram showing a bent state of a substrate before attachment of the polarization plate, and FIG. 4B illustrates a diagram showing a bent state of a substrate after attachment of the polarization plate. It can be seen that the bending tends to be more intense at edges rather than at a center of the liquid crystal panel. This is because of a difference of thermal expansion coefficients between the substrate and the polarization plate causes a difference of lengths between the polarization plate of a film and the substrate of a glass plate arising from shrinkage and expansion of the polarization plate and the substrate at the time of thermal fabrication process (heating and cooling down) after the attachment of the polarization plate.

FIG. 5 illustrates a flow chart showing the steps of a related art method for fabricating a color filter array in a liquid crystal display device. The method includes the steps of: providing a second substrate (S10); forming a black matrix layer (S11); forming a R, G, B color filter layer on the second substrate including the black matrix layer. In this instance, respective color films are formed by dividing and patterning regions of the color films (S12). An overcoat layer is formed on the second substrate including the R, G, B color filter layer (S13), and, an organic film is coated on an entire surface of the overcoat layer. The organic film is removed selectively to form column spacers (S14).

A TFT array substrate suitable to be disposed opposite to the color filter substrate is formed according to the following steps: a metal is deposited on a first substrate, and removed selectively, to form a gate line having a gate electrode projected therefrom; a common line is formed in a same direction as the gate line by patterning the metal, and a common electrode is formed branched from the common line in a pixel region. Then, a gate insulating film is formed on an entire surface of the first substrate to cover the gate line having the gate electrode projected therefrom; a semiconductor layer is deposited on the gate insulating film, and removed selectively, to form a semiconductor layer on the gate insulating film over the gate electrode. A metal is deposited on the gate insulating film including the semiconductor layer, and removed selectively, to form a data line perpendicular to the gate line having a source electrode projected therefrom, and a drain electrode spaced a predetermined distance from the source electrode. Then, a protective film is formed on the gate insulating film including the data line and the source/drain electrodes. The protective film is removed selectively, to form a contact hole exposing a predetermined portion of the drain electrode, and a transparent electrode is deposited on an entire surface of the protective film including the contact hole, and removed selectively, to form a pixel electrode electrically connected to the drain electrode and alternating with the common electrode.

A process for fabricating a cell in the related art liquid crystal display device will be described with reference to FIG. 6. A first substrate having a plurality of thin film transistors defined thereon, and a second substrate having a color filter array defined thereon are provided. The thin film transistor array, and the color filter array are formed on a display region of each unit panel.

Then, an alignment film is formed on the display region of each unit panel of the first substrate and the second substrate (S21). Liquid crystals are dispensed on one of the first, and second substrates (S22). A seal pattern having a predetermined width is formed on a non-display region (a portion excluding the active portion) of one of the first, and second substrates (S23).

The other substrate having no liquid crystal dispensed thereon is inverted (S24), and the first and the second substrates are bonded to form a liquid crystal panel (S25). Though the flow chart illustrates that the liquid crystals are dispensed on the first substrate, and the seal pattern is formed on the second substrate, the liquid crystals may be dispensed on the second substrate, and the seal pattern may be formed on the first substrate. Alternatively, both the dispensing of the liquid crystals and the formation of the seal pattern may be made only on one of the substrates. In any case, the liquid crystal will not be dispensed on the substrate that will be inverted.

An ultra-violet (UV) beam is directed to the first substrate through the seal pattern, or to the seal pattern on a back side of the second substrate, to cure the seal pattern, to bond the first, and second substrates together (S26). Then, the liquid crystal panel is cut/processed in unit of the unit panel, to form a plurality of unit liquid crystal panels (S27).

A pad portion (a portion of the first substrate formed greater than the second substrate, so as to be exposed after the bonding) of the unit liquid crystal panel is inspected to determine whether the unit liquid crystal panel is accepted, or rejected (S28).

However, the related art liquid crystal display device and a method for fabricating the same have the following problems. First, the liquid crystal display device involved in shrinkage and expansion of the polarization film after attachment of the polarization film to the surface of the panel, to cause bending of the liquid crystal panel coming from a difference of thermal expansion coefficients of the substrate and the polarization film. The bending becomes the more extensive as a size of the panel becomes the greater. Second, the liquid crystal display device shows non-uniformity of luminance in a black state when the panel is touched, such as wiping of the panel.

The non-uniformity of luminance occurs in a black state because the shrinkage or slackening of a polarization plate attached to the liquid crystal panel by change of environmental humidity and temperature distorts the substrate by bending, which disturbs the orientation of the liquid crystals. Rubbing causes a translational shift in a range of 20~100 μm between upper and lower substrates, to cause the leakage of light as the two substrates fail to return to original positions immediately even if the finger is removed. This is because a force with which a column spacer in close contact with an opposite substrate pulls the opposite substrate is greater than a force tending to return the substrate to an original position.

SUMMARY

A liquid crystal display device, and a method for fabricating the same, is described. An alignment film is formed divided into a plurality of sub-alignment films spaced from each other. A column spacer is formed in the space between the sub-alignment films.

A liquid crystal display device includes a first substrate, and a second substrate opposite to each other. A first alignment film is disposed on the second substrate. The first alignment film has a first alignment film groove in a portion thereof. A first spacer is disposed in the first alignment film groove between the first substrate and the second substrate, and a liquid crystal layer is disposed between the first substrate and the second substrate.

In another aspect, a liquid crystal display device includes a first substrate and a second substrate disposable opposite to each other, gate lines and data lines disposed on the first substrate perpendicular to each other to define pixel regions, a black matrix layer on the second substrate disposable opposite to regions excluding the pixel regions, a color filter layer on the second substrate, an overcoat layer on an entire surface of the second substrate including the black matrix layer and the color filter layer, a first alignment film having a first alignment film groove on the overcoat layer over the black matrix layer, a first spacer in the first alignment film groove and disposable between the first substrate and the second substrate, and a liquid crystal layer between the first substrate and the second substrate.

In yet another aspect, a method for fabricating a liquid crystal display device includes providing a first substrate and a second substrate each having a display region and a non-display region defined separately. A thin film transistor array is formed on the first substrate. A color filter array is formed on the second substrate. A first alignment film is formed on the second substrate. The first alignment film has a portion removed therefrom to form a first alignment film groove. Liquid crystals are disposed on the first substrate in the display region. A spacer is formed at a portion of the first alignment film groove on the second substrate. A seal pattern is formed on the non-display region of the second substrate. The second substrate is inverted, are opposing surfaces of the first substrate and the second substrate are pressed together so as to join the first and second substrates.

BRIEF DESCRIPTION OF THE DRAWINGS

FIGS. 4A and 4B illustrate diagrams showing bending simulation of a substrate before and after attachment of a polarization plate, respectively;

DETAILED DESCRIPTION

Reference will now be made in detail to examples of the present invention, which are illustrated in the accompanying drawings. Wherever possible, the same reference numbers will be used throughout the drawings to refer to the same or like parts.

A liquid crystal display device, and a method for fabricating the same includes an alignment film formed divided into a plurality of sub-alignment films spaced from each other, and a column spacer formed in the space between the sub-alignment films. The space between the sub-alignment films is called as an alignment film groove.

Cases will be described, in which a liquid crystal display device of the present invention is applied to a TN mode and an IPS mode.

Figure 1:
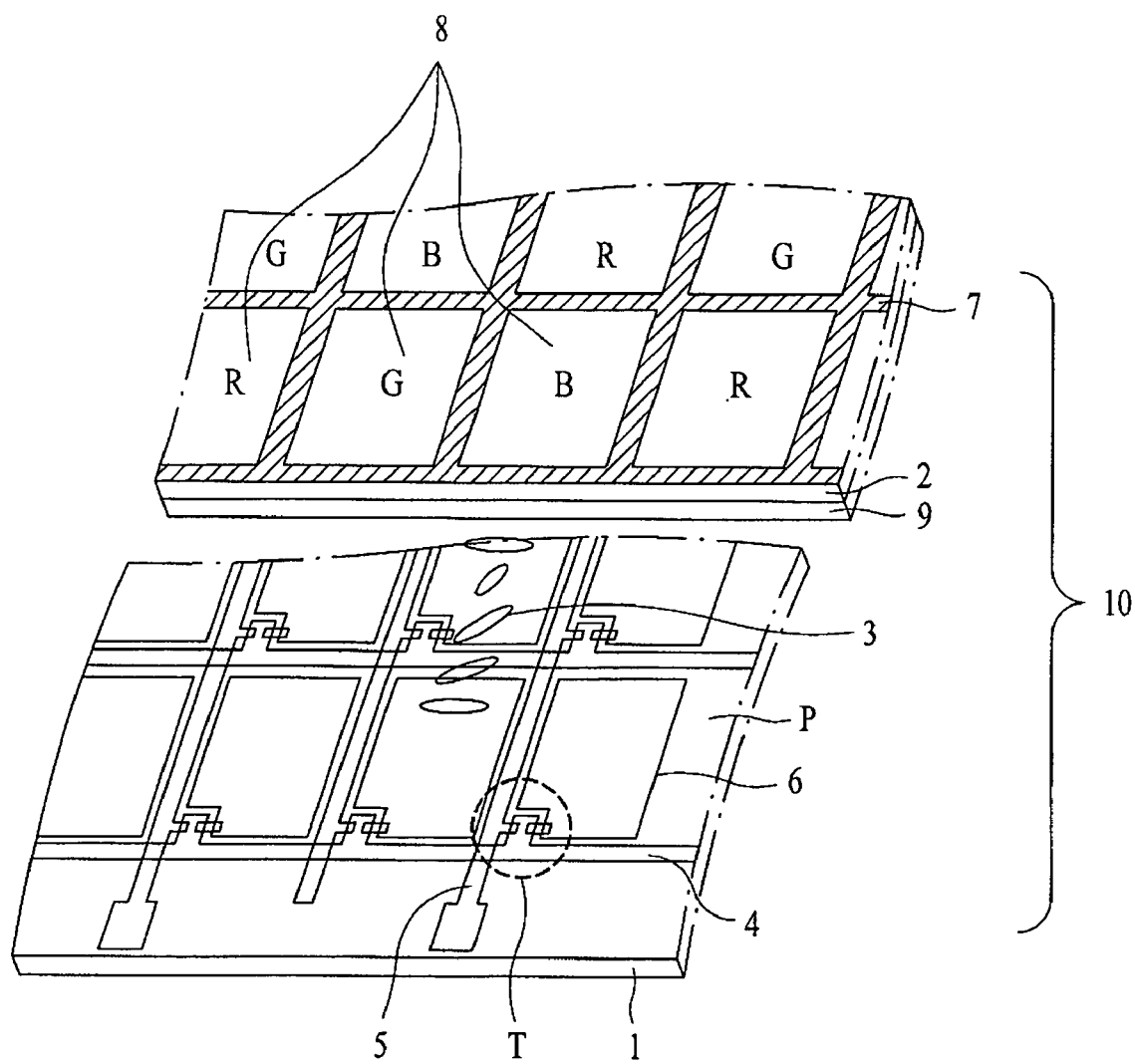
FIG. 1 illustrates an exploded perspective view of a related art liquid crystal display device.
Figure 2:
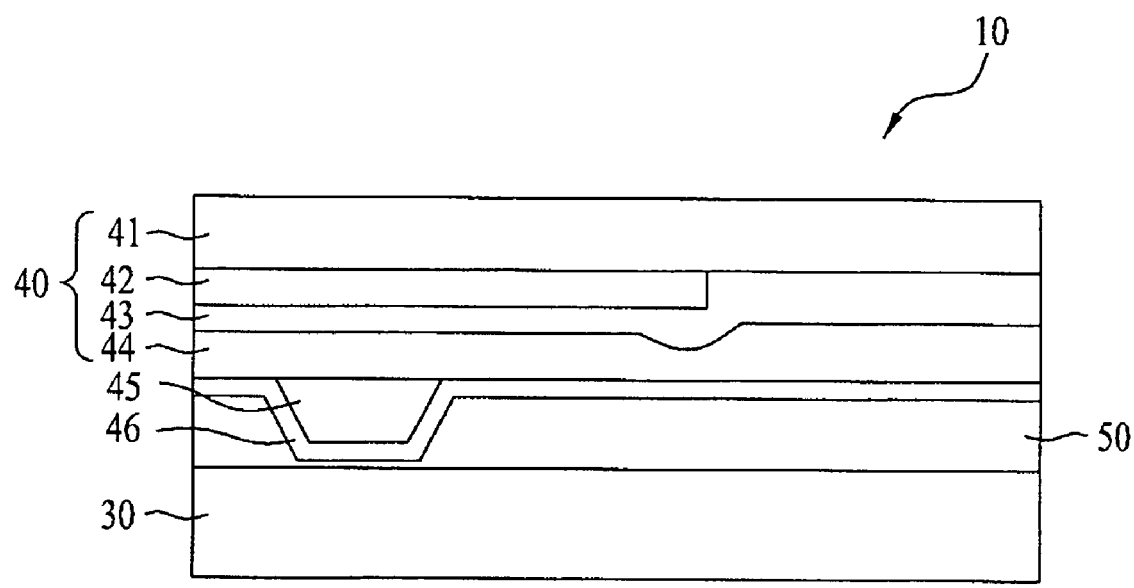
FIG. 2 illustrates a section of a related art IPS mode liquid crystal display device.
Figure 3A:
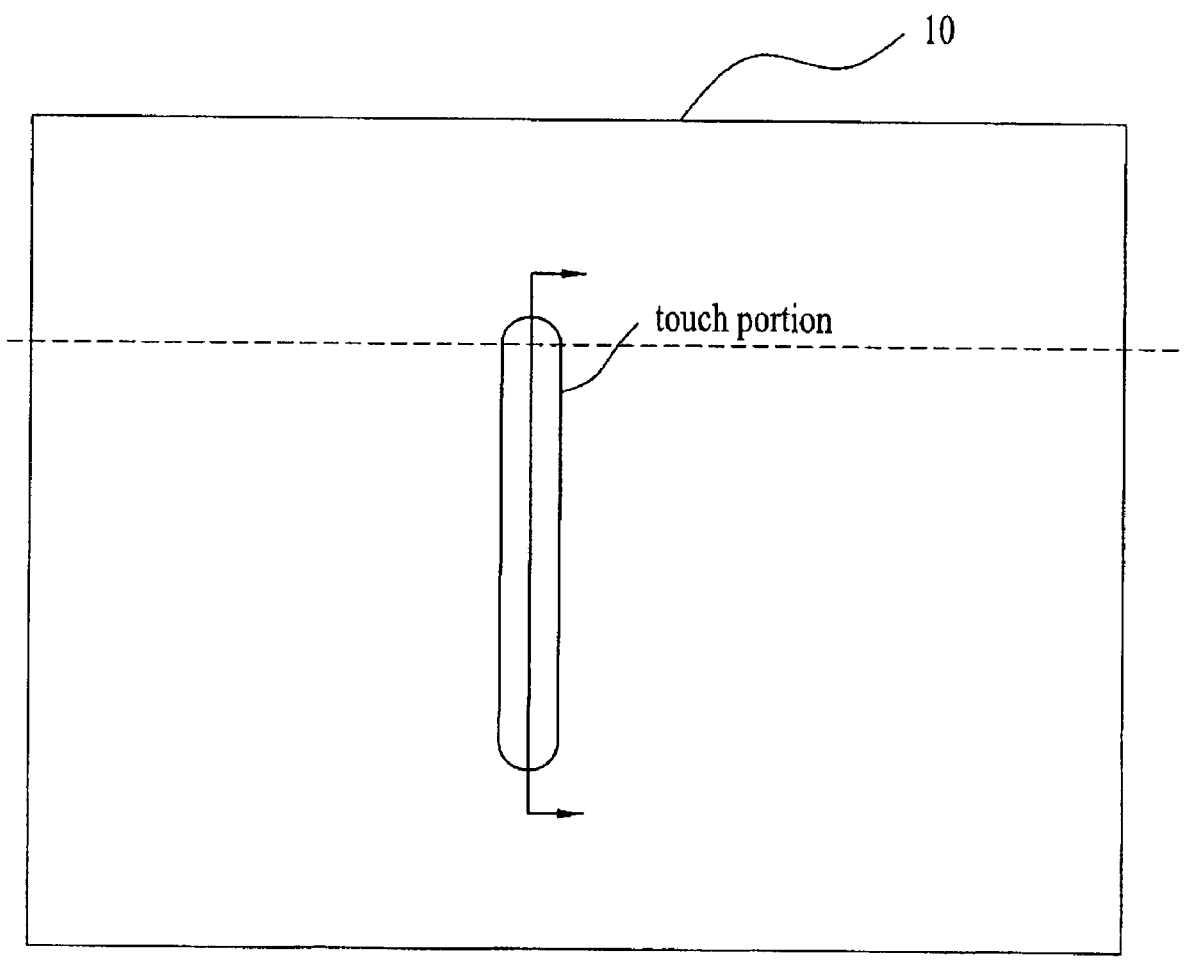
FIGS. 3A and 3B illustrate a plan view and a section of a liquid crystal panel having a touch defect, respectively.
Figure 3B:
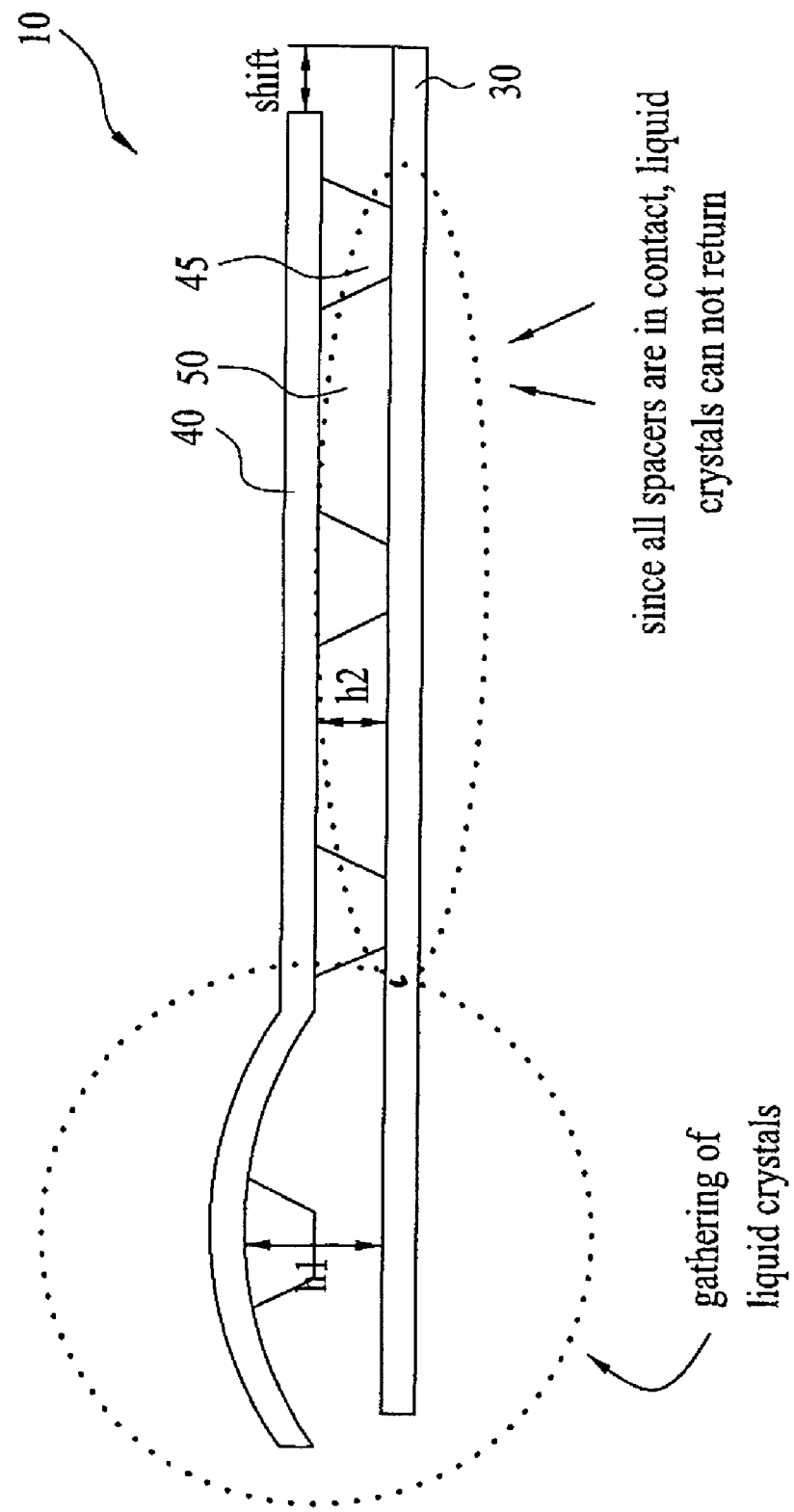
Figure 5:
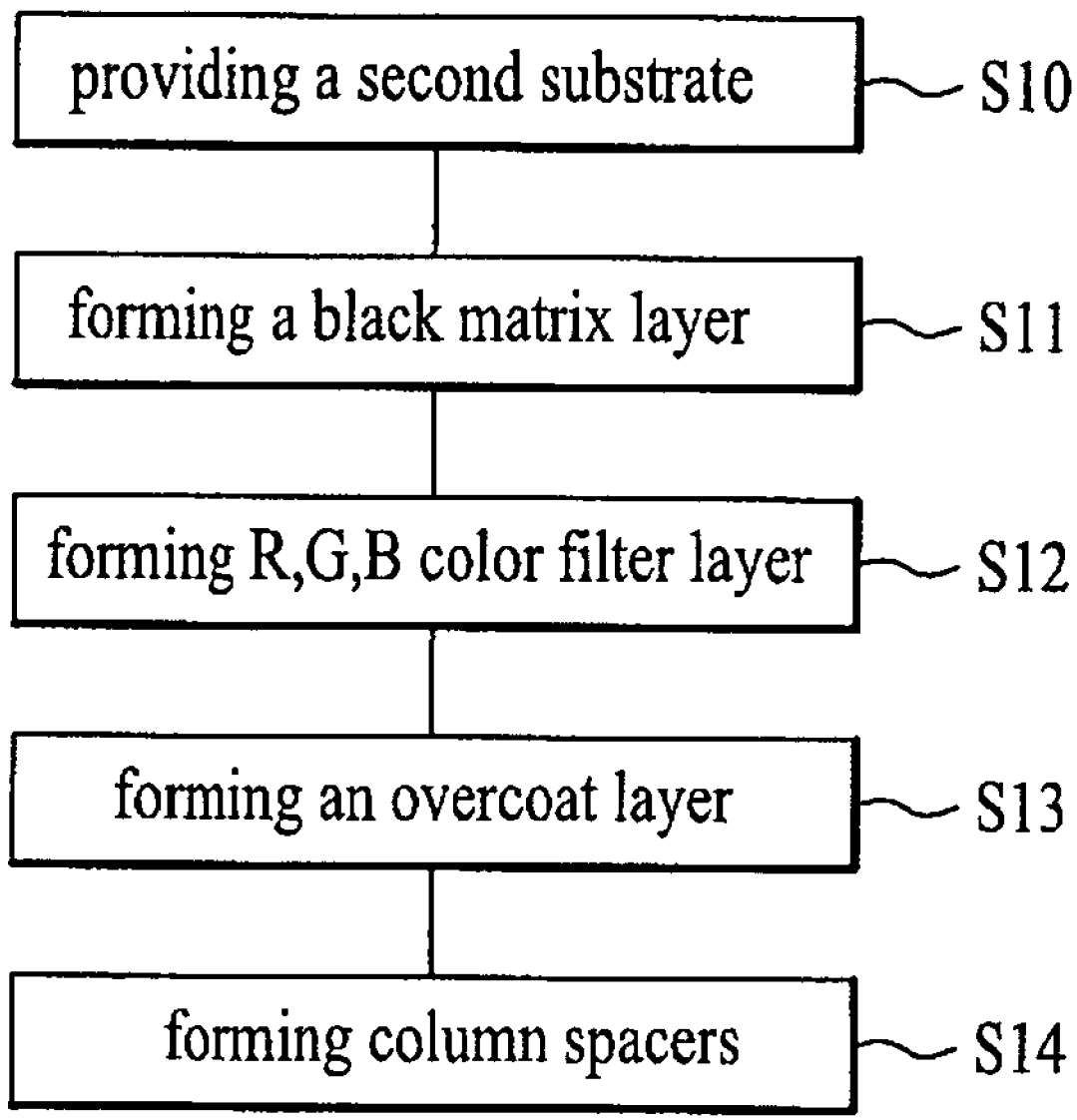
FIG. 5 illustrates a flow chart showing the steps of a related art method for fabricating a color filter array in a liquid crystal display device.
Figure 6:
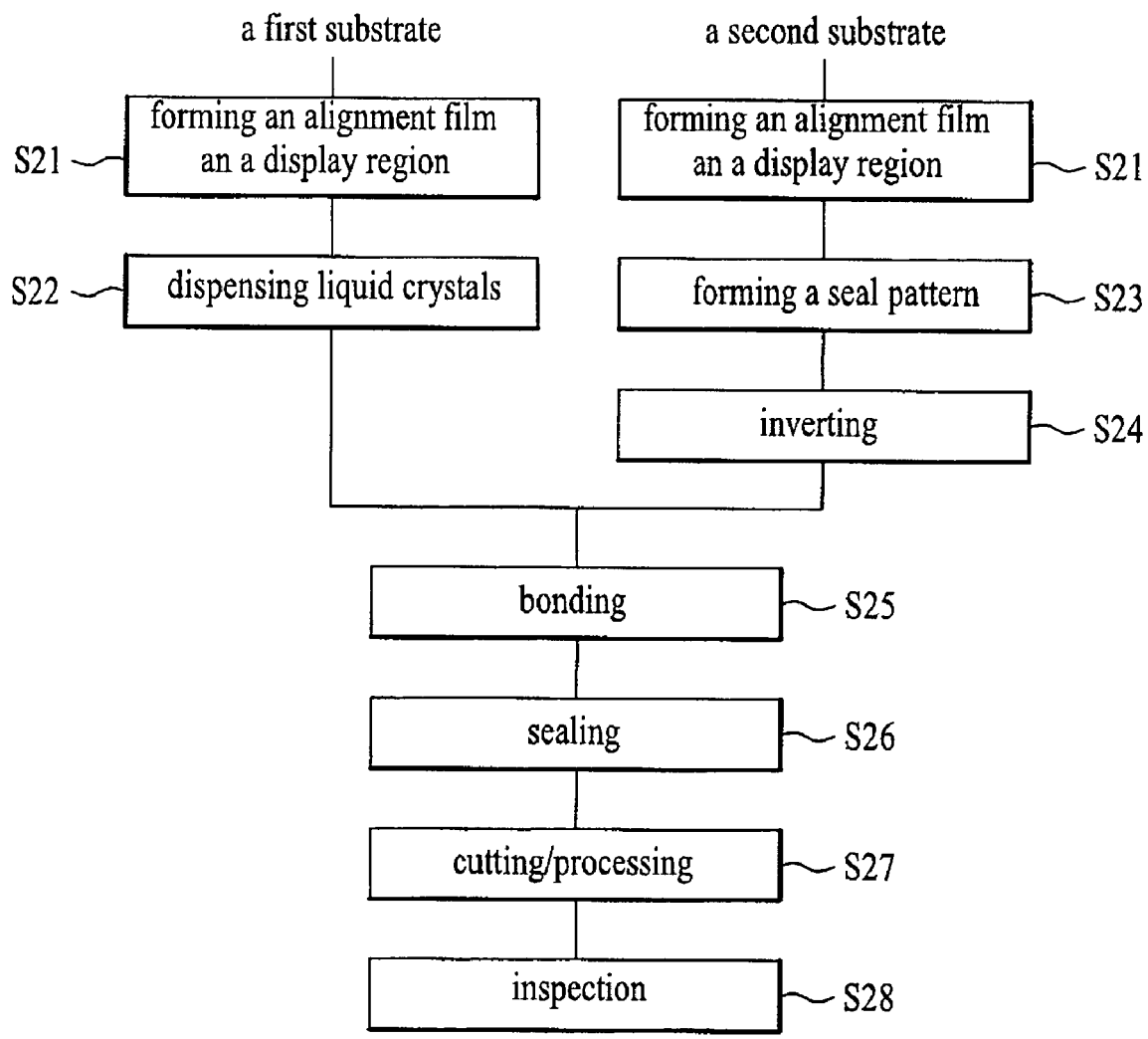
FIG. 6 illustrates a flow chart showing the steps of a process for fabricating a cell in the related art liquid crystal display device.
Figure 7A:
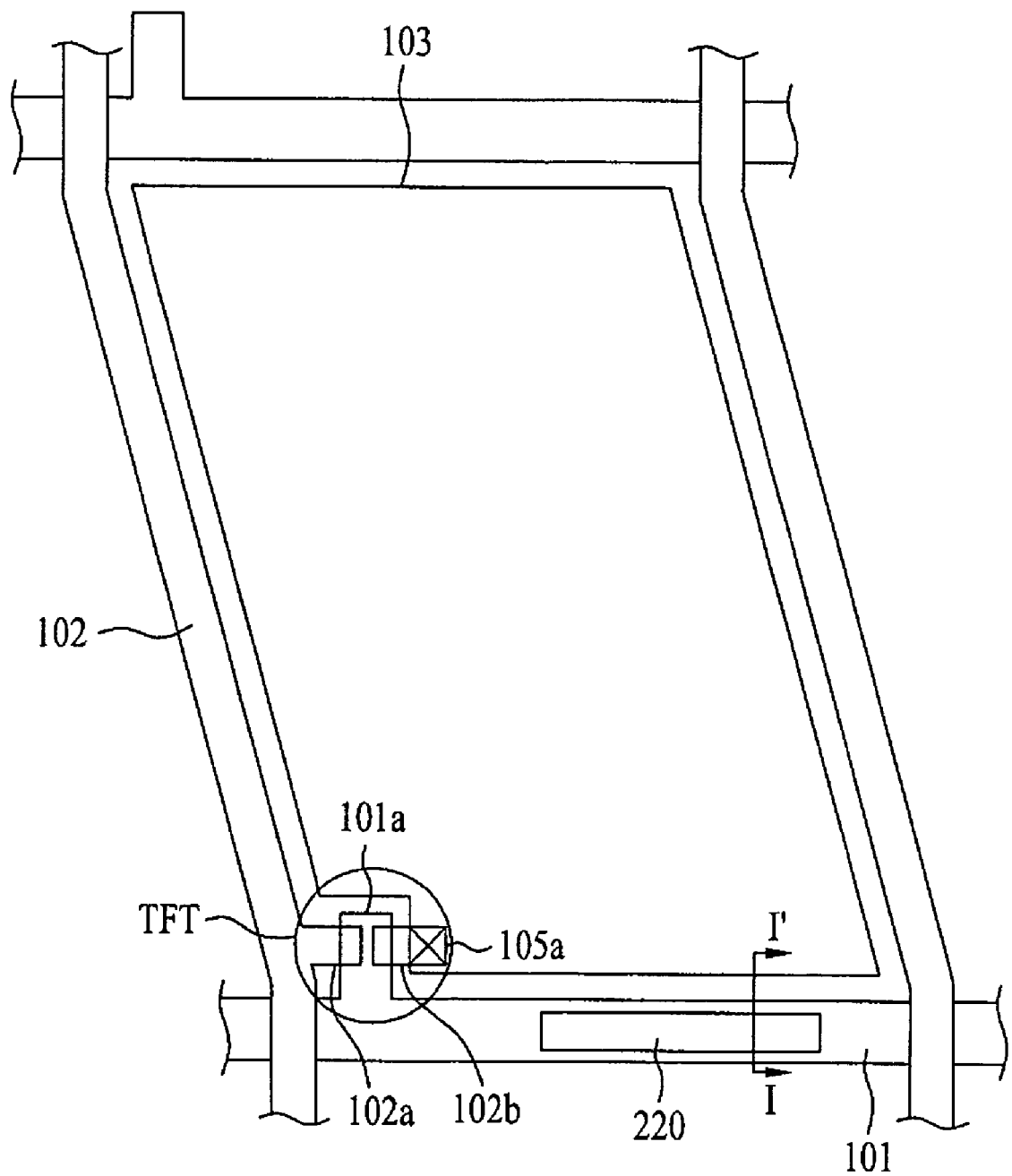
FIG. 7A illustrates a plan view of a sub-pixel in a case a liquid crystal display device is applied to a TN mode.
Figure 8:
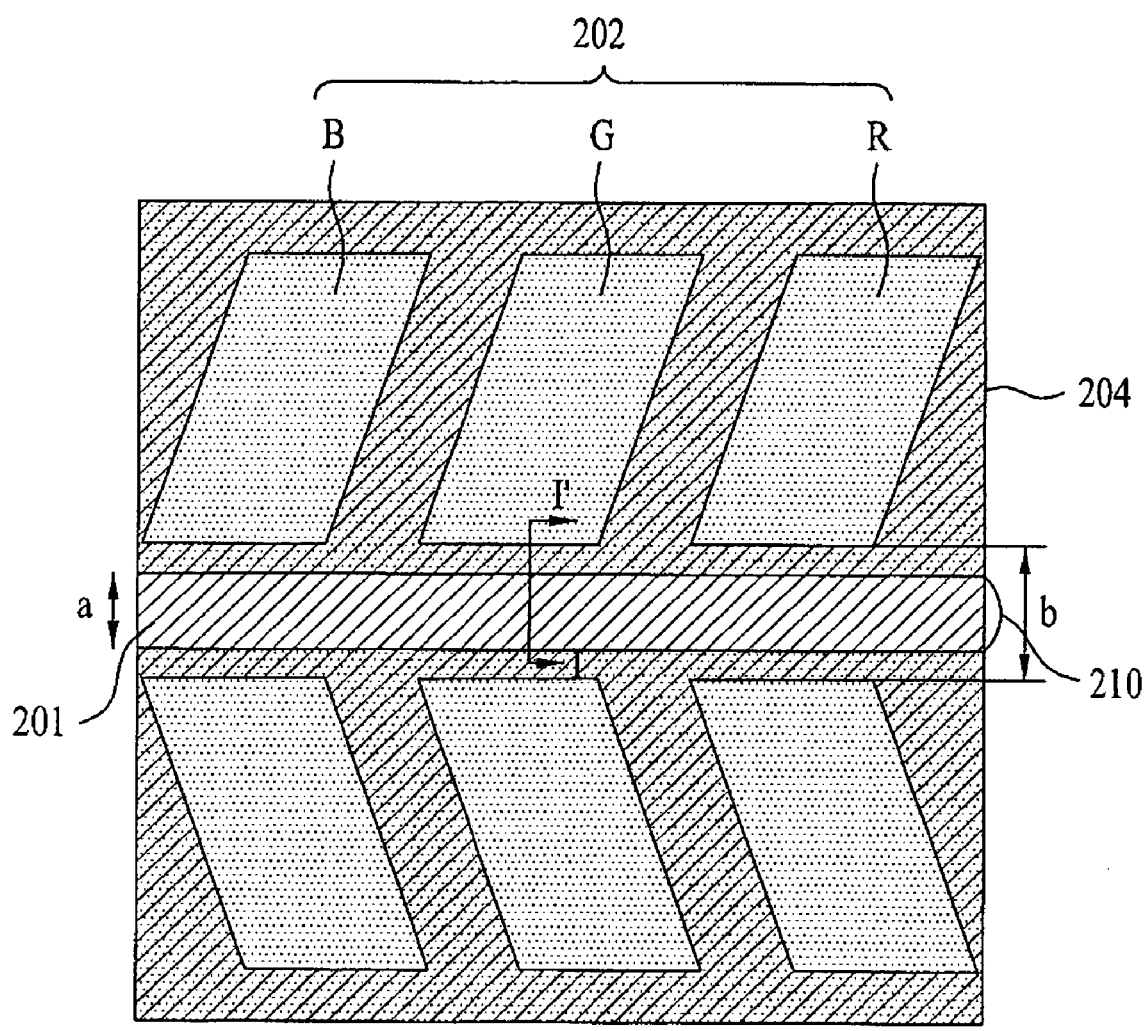
FIG. 8 illustrates a plan view of a color filter array in accordance with a embodiment.
Figure 9:
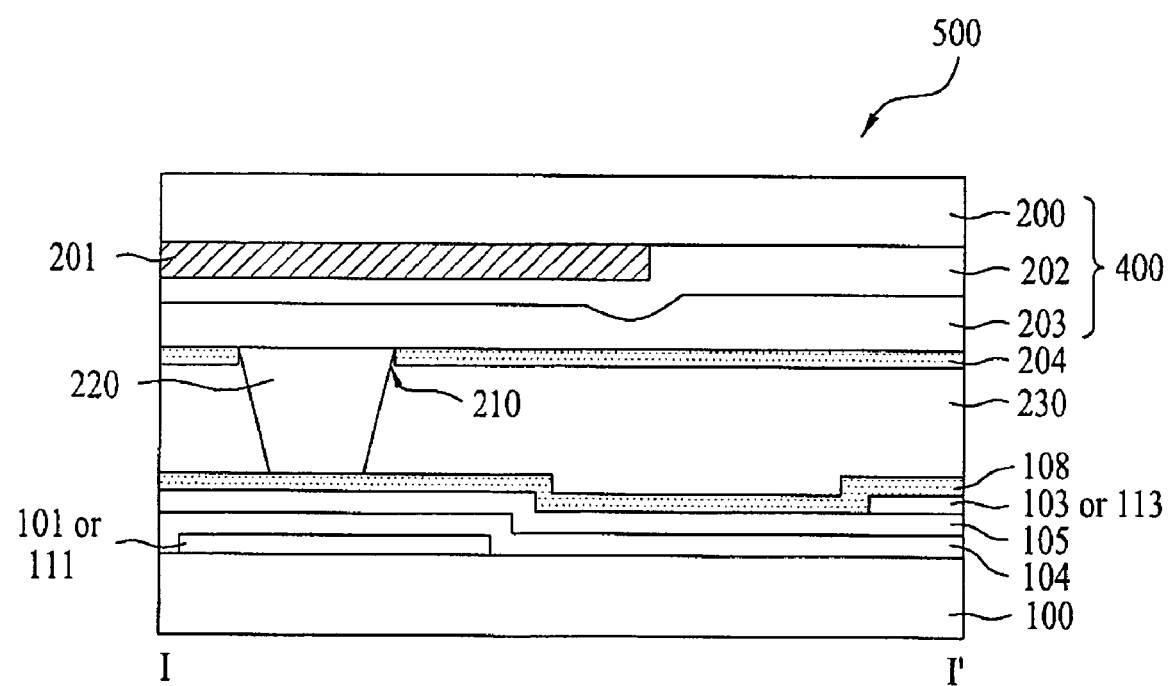
FIG. 9 illustrates a section across a line I-I' in FIG. 7A or 7B.

Referring to FIGS. 7A, 8, and 9, a liquid crystal panel of a liquid crystal display device applied to the twisted nematic (TN) mode includes opposing first, and second substrates 100, and 200 having a thin film transistor (TFT) array and a color filter array formed thereon, respectively, and liquid crystals filled between the first, and second substrates 100, and 200.

The TFT array on the first substrate 100 includes gate lines 101 and data lines 102 perpendicular to each other to define pixel regions, a TFT at each cross of the gate lines 101 and data lines 102, and a pixel electrode on each of the pixel regions.

The TFT includes a gate electrode 101a projected from the gate line 101, a source electrode 102a projected from the data line 102, a drain electrode 102b spaced a predetermined distance from the source electrode 102a, and a semiconductor layer (not shown) formed between layers of the gate electrode 101a, and the drain electrode 102b and source electrode 102a. In this instance, the gate insulating film 104 is between the semiconductor layer and the gate electrode 101a, and the source electrode 102a and the drain electrode 102b are positioned opposite to the semiconductor layer.

The gate insulating film 104 is disposed between layers of the gate line 101 and the data line 102, and a protective film 105 between layers of the data line 102 and the pixel electrode 103. The protective film 105 has a contact hole 105a exposing a predetermined portion of the drain electrode 102b, so that the pixel electrode 103 is connected to the drain electrode 102b through the contact hole 105a.

Formed on the second substrate 200 opposing the first substrate 100, are a black matrix layer 201 to cover portions excluding the pixel regions and the thin film transistors, an R, G, B color filter layer 202 including the black matrix layer 201, and an overcoat layer 203 (shown in FIG. 9) on en entire surface of the second substrate 200 including the black matrix layer 201 and the color filter layer 202. In the TN mode, the overcoat layer 203 may be replaced with a common electrode, or the common electrode (not shown) may be formed on entire surface of the overcoat layer 203.

The second substrate 200, the black matrix layer 201, the color filter layer 202, the overcoat layer 203, and the common electrode (not shown), may be collectively called a color filter array substrate 400 as they may be formed in a color filter array fabricating step.

Figure 7B:
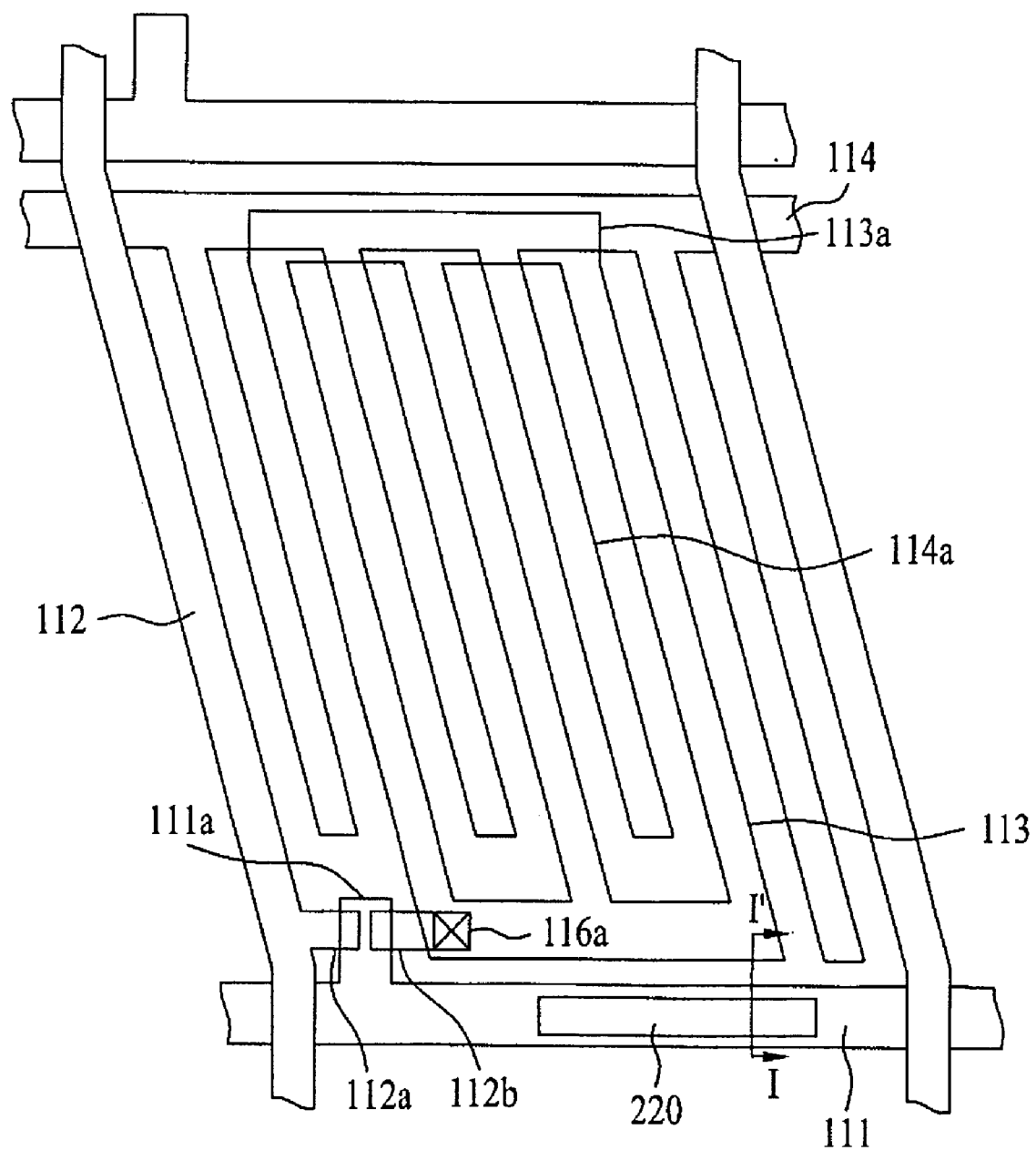
FIG. 7B illustrates a plan view of a sub-pixel in a case a liquid crystal display device is applied to an IPS mode.

Referring to FIGS. 7B, 8, and 9, a liquid crystal display device using IPS mode is similar to a structure of the TN mode except that a common line 114 is formed in a direction the same with the gate line 111 crossing the pixel region on the first substrate 100, the pixel electrode 113 and the common electrode 114a are formed on the pixel region alternately, and the common electrode is formed not on the second substrate 200, but the overcoat layer 203 is formed on the second substrate 200. In the IPS mode, the common electrode 114a is branch from the common line 114, and the pixel electrode 113 is formed as one body with a storage electrode 113a a predetermined portion of which is overlapped with the common line 114 in the pixel region.

Since the IPS mode device is similar to the TN mode device except that no common electrode is formed on the second substrate 200, a description of the color filter layer formed on the second substrate 200 is omitted.

An alignment film groove 210 is formed between the sub-alignment films in the liquid crystal device of the present invention, on or opposite to a non-pixel region, i.e., on or opposite to the gate line 101, or 111, the data line 102, or 112, or a portion of the TFT. In this case, the alignment film groove 210 may be formed in a direction of a line. That is, the alignment film groove 210 is formed on, or opposite to, the data line 101, or 111, or the data line 102, or 111. In this instance, as shown in FIGS. 8 and 9, the alignment film groove 210 is formed on the black matrix layer 201 opposite to the gate line 101, or 111, or on the black matrix layer 201 opposite to the data line 102, or 112, or on the black matrix layer 201 opposite both to the gate line and the data line.

The alignment film 204 may be formed by inkjet printing, offset printing, or pressing by using a roller. The alignment film 204 is formed of PI (Polyimide) or the like in a cell fabrication step after a color filter array fabrication step in parallel with formation of an alignment film 108 on a surface (of the thin film transistor array) of the first substrate opposite to the alignment film 204. In this case, an alignment film groove may also be formed in the alignment film 108 at a portion opposite to the alignment film groove 210 (FIG. 9 illustrates a case without the alignment film groove).

Moreover, the alignment film 108 having the alignment film groove may be formed on the first substrate 100, and the column spacers may be formed in the alignment film groove. In this instance, the alignment film 204 on the second substrate 200 may be omitted.

The column spacer 220 is formed in the alignment film groove 210 limited to a predetermined portion. That is, the column spacer 220 is formed, not on an entire region of the gate line 101, or 111, the data line 102, or 112, or the thin film transistor TFT, but on required portions thereof selectively taking contact concentration with an opposite substrate 100 (the first substrate) required for maintaining a cell gap into account. In the drawings, the column spacers 220 are formed at least opposite to the gate line 101, or 111. Depending on cases, the column spacers 220 are formed opposite to the gate line, and the column spacers 220 may be formed opposite to the data line, additionally.

Referring to FIGS. 8 and 9, on the overcoat layer 203, there is the alignment film 204 having the alignment film groove 210 defined therein, with a predetermined width 'a' within a width of the gate line 101, or 111 of the first substrate. The column spacer 220 is formed in the alignment film groove 210 after the alignment film 204 is formed.

The black matrix layer 201 is formed to cover portions except the pixel regions, and portions of the thin film transistors. That is, the black matrix layer 201 is formed in a shape in conformity with the gate line 101, or 111 with a width grater than the gate line in a width direction, and in a shape in conformity with the data line 102, or 112 with a width grater than the data line in a length direction. Since the data line 102, or 112 is formed in an oblique length direction, the length direction line of the black matrix layer 201 is formed in the oblique length direction, and if the data line 102 or 112 is formed perpendicular to the gate line 101, or 111, a length direction line of the black matrix layer for the data line 102, or 112 is also formed perpendicular to the gate line.

The alignment film 204 formed to define the alignment film groove 210 in the width direction line of the black matrix layer 201 at a position spaced a predetermined distance to an inner side from an edge of the width direction line. In this instance, if it is assumed that a length direction width of the width direction line of the alignment film groove 210 is 'a', and a width direction width of the length direction line of the black matrix layer 201 is 'b', the alignment film groove 210 is defined as 'a<b'.

The column spacer 220 may have a polygonal column including a cylindrical column formed between the first substrate 100 and the second substrate 200. The column spacer 220 consists of initiator, photoreactive polymer, and adhesion promoter. The initiator includes photoinitiator, and thermoinitiator, both of which can be used, or one of which can be used, selectively. Besides above components, a thermoreactive polymer may be further included. The column spacer 220 may contain fine spherical ball spacers in a range of polydispersity.

As an alternative to the column spacer 220, a ball spacer may be formed at the alignment film groove 210 with a size substantially the same as the cell gap.

Since the column spacer 220 or the ball spacer is formed in the alignment film groove 210 after the alignment film 204 is formed, the liquid crystal display device of the present invention can make strong bonding between the column spacer and an opposite substrate (first substrate) as the second substrate including the column spacer is inverted and bonded before the spacer is cured finally, and the column spacer 220 is cured finally after the bonding. That is, owing to increased molecular movements of material of the column spacer caused by heating in the final curing, to generate an adhesive force with an opposite surface of a substrate (the first substrate), the bonding with the opposite substrate becomes stronger.

Figure 10:
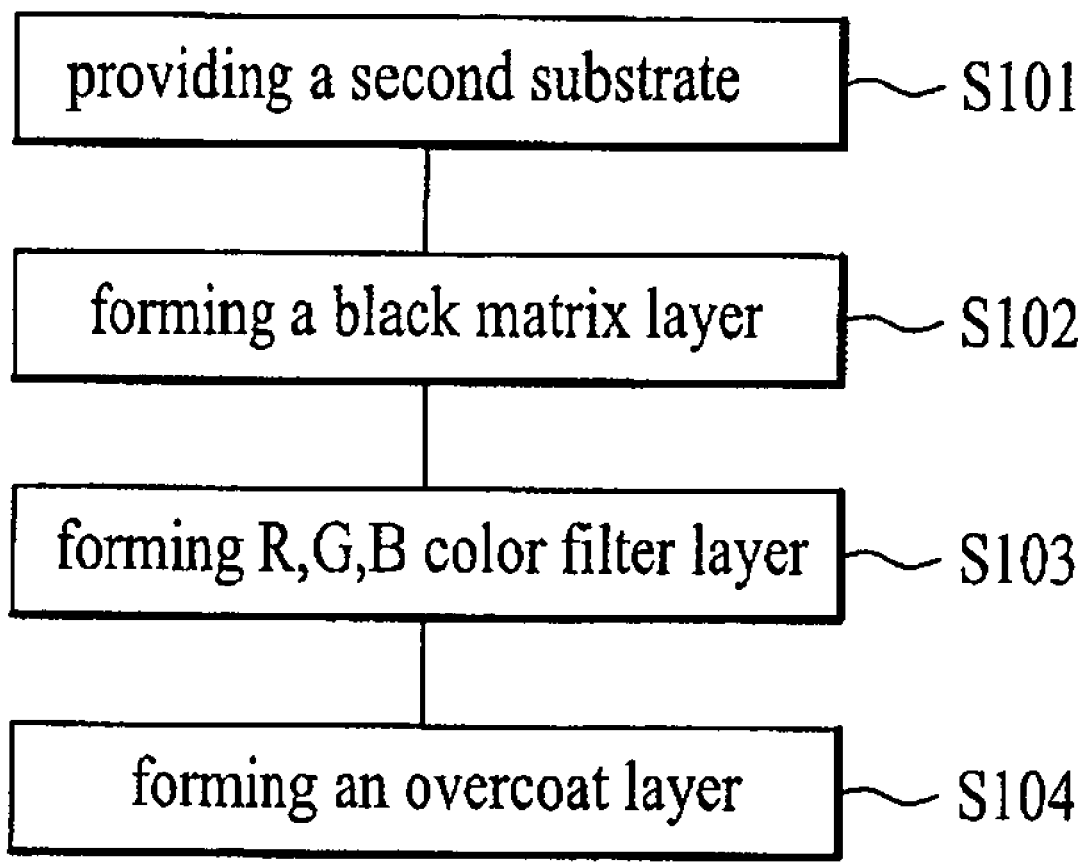
FIG. 10 illustrates a flow chart showing the steps of a process for fabricating a color filter array.

FIG. 10 illustrates a flow chart showing the steps of a process for fabricating a color filter array in accordance with a preferred embodiment of the present invention. A second substrate is provided (S101), and chrome Cr or black resin is coated on the second substrate, and removed selectively, to form a black matrix layer on regions except pixel regions (S102). A 'R' color film, a 'G' color film, and a 'B' color film on the second substrate including the black matrix layer are patterned to leave the R, G, B films on required regions, forming a R, G, B color filter layer (S103). An overcoat layer is formed on an entire surface of the second substrate including the black matrix layer and the R, G, B color filter layer (S104). After a first substrate (see 100 in FIG. 9) is provided, a metal is deposited on the first substrate 100, and removed selectively, to form a gate line 101 having a gate electrode (see 101a in FIG. 7A) projected therefrom. In a case of the IPS mode device, at the time of patterning of the metal a common line 114 is formed in a same direction as the gate line (see 111 in FIG. 7B), and a common electrode 114a branched from the common line 114 is formed in a pixel region.

Then, a gate insulating film 104 is formed on an entire surface of the first substrate 100 to cover the gate line 101 having the gate electrode 101a projected therefrom. A semiconductor layer material is deposited on the gate insulating film 104, and removed selectively, to form a semiconductor layer (not shown) on the gate insulating film over the gate electrode. A metal is deposited on the gate insulating film 104 including the semiconductor layer, and removed selectively, to form a data line 102 perpendicular to the gate line 101 having a source electrode 102a projected therefrom, and a drain electrode 102b spaced a predetermined distance from the source electrode 102a. A protective film 105 is formed on the gate insulating film 104 including the data line 102, the source/drain electrodes 102a/102b.

The protective film 105 is removed selectively, to form a contact hole 105a exposing a predetermined portion of the data electrode 102b, and a transparent electrode is deposited on an entire surface of the protective film including the contact hole 105a, and removed selectively, to form a pixel electrode 103 electrically connected to the drain electrode 102b. In the case of the IPS mode, the pixel electrode 113 is formed to alternate with the common electrode 114a.

Figure 11:
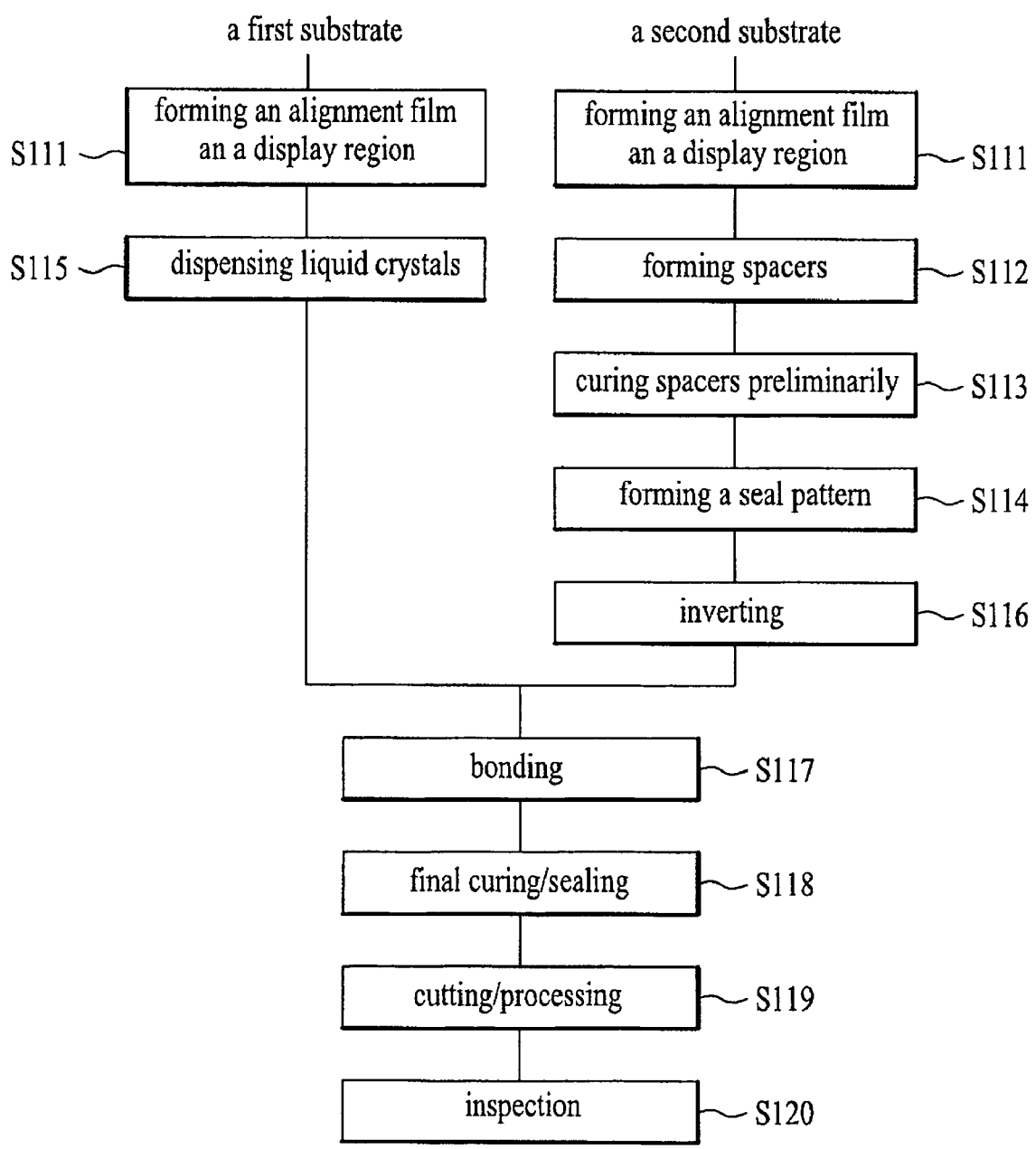
FIG. 11 illustrates a flow chart showing the steps of a process for fabricating a cell.

After finishing the TFT array fabrication step, and the color filter array fabrication step on the first substrate and the second substrate respectively, the cell fabrication step is performed. In this instance, above fabrication steps are performed at respective display regions after the first substrate, and the second substrate respectively having display regions and non-display regions around the display regions are provided. In the array fabrication step, pads for the gate line and the data line are formed on the first substrate opposite to the non-display regions, and the black matrix layer is formed on the second substrate. The cell fabrication step is a step for bonding two substrates after the array fabrication steps are performed on the first, and second substrates. FIG. 11 illustrates a flow chart showing the steps of a process for fabricating a cell. An alignment film having an alignment film groove is formed on a predetermined portion of a display region of each of the first substrate and the second substrate (S111).

Figure 12:
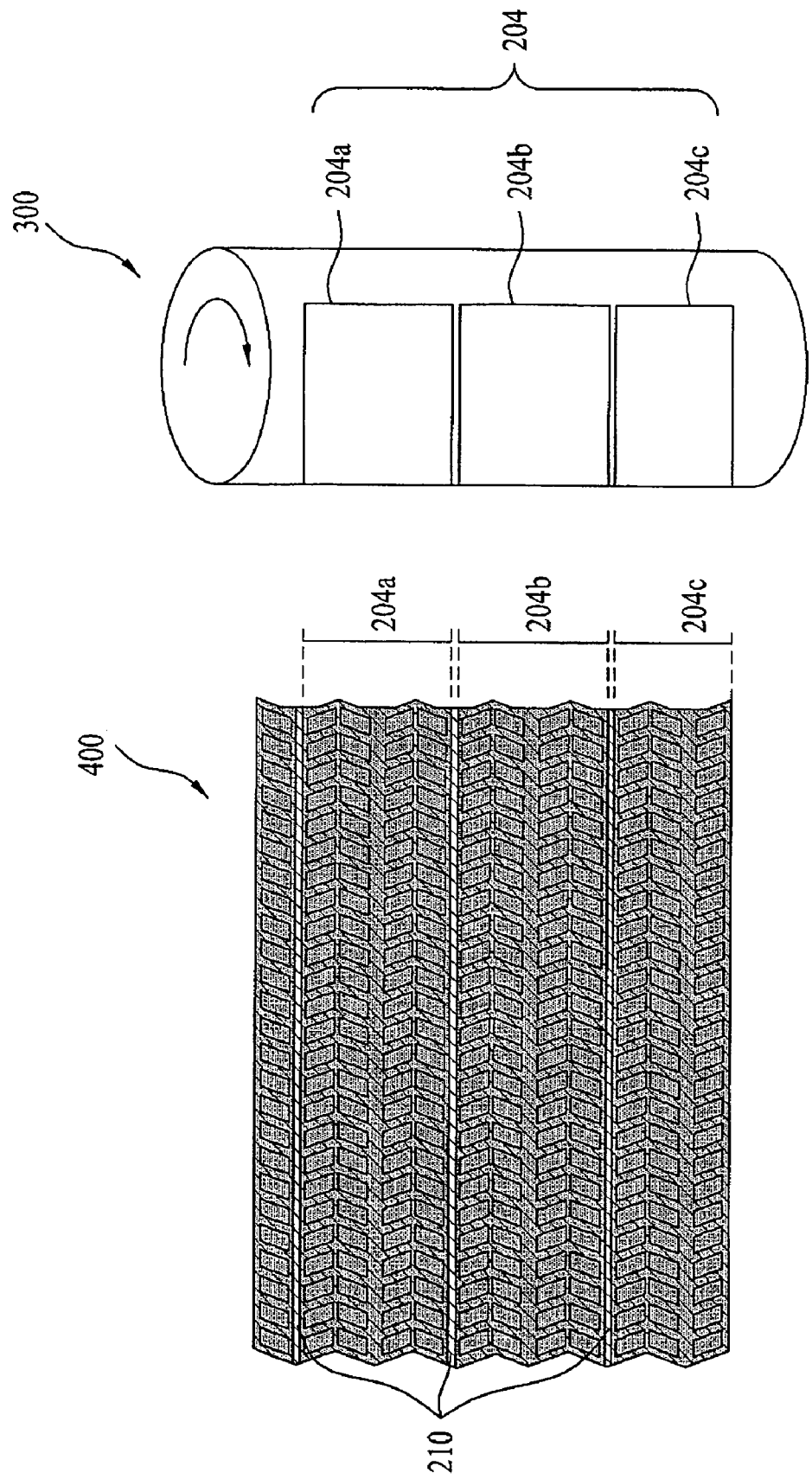
FIG. 12 illustrates a diagram of a method for dividing an alignment film.

Then, a column spacer is formed in a predetermined portion of the alignment film groove (S112). The column spacer may positioned over the black matrix layer opposite to the gate line or the data line. The column spacer may be formed by inkjet dotting on a required region with an inkjet device (FIG. 13), by offset printing (FIG. 14), or pressing an alignment film material on a surface of the substrate with a roller (FIG. 12).

A UV beam is directed onto the column spacer to cure the column spacer preliminarily (S113). In this instance, a curing ratio of the column spacer is dependent on composition of the column spacer. That is, the curing ratio of the column spacer is determined according to contents of the photoinitiator, and the photoreactive polymers (photoreactive acrylmonomer, a monomer containing both photoreactive and thermoreactive components, oligomer, or polymer) at the time of the preliminary curing. The proportions of the photoinitiator and the photoreactive polymer are adjusted so that the curing ratio is in a range of 50%~70% when the UV beam is directed onto the column spacer.

Then, a seal pattern is formed on the non-display region of the first substrate or the second substrate (S114).

Liquid crystals are dispensed on one of the first, and the second substrates (S115). Although the flow chart shows that the liquid crystals are dispensed onto the first substrate, the liquid crystal may be dispensed onto any one of the first, and second substrates, selectively.

A substrate having no liquid crystal dispensed thereon is inverted (S116), and the first and second substrates are bonded with the arrays thereon aligned to each other, to form a liquid crystal panel (S117). In this example, the second substrate is inverted since no liquid crystals are dispensed thereon.

Then, a UV beam is directed onto a back side of the first or second substrate, to cure the seal pattern for sealing (S118).

The first and second substrates are heat treated in an oven, to thermally cure the seal pattern and the column spacer. In this step, a support tray having no holes, or fine holes, is used for preventing the bonded first and second substrates from sagging. In this instance, the column spacer is adhered to an opposite first substrate as molecules of the column spacer generates adhesive force owing to heat in the thermal curing step, and cured fully by the thermal curing. Then, the liquid crystal panel is divided into a plurality of unit liquid crystal panels by cutting/machining the liquid crystal panel into unit panels (S119).

A pad portion (a portion of the first substrate formed greater than the second substrate, so as to be exposed after the bonding) of the unit liquid crystal panel is inspected to determine whether the unit liquid crystal panel is accepted, or rejected (S120).

Referring to FIG. 12, in order to form the alignment film having an alignment film groove 210, material of first, second, and third sub-alignment films 204a, 204b, and 204c is applied to a surface of a roller 300, and material is printed on the overcoat layer (see 203 in FIG. 8) of the color filter array substrate 400 (formed up to the overcoat layer including the black matrix layer, and the color filter layer), to form the alignment film 204 having the alignment film groove. In this instance, the alignment film 204 is coated such that, for an example, if a width of the length direction line of the black matrix layer (see 201 in FIG. 8) is 140 µm, the divided alignment film 204 is formed up to a portion spaced inwardly to a center line of the length direction line of the black matrix layer from opposite edges of the length direction line of the black matrix layer 201. The line width of the length direction line of the alignment film groove 210 may be 100 µm.

In this example, referring to FIG. 12, at the time of application of the material of the first to third sub-alignment films 204a, 204b, and 204c to the surface of the roller 300, the space between the sub-alignment films can be formed by adjusting a number and a size of pass-through portions of a mask used in application of the material to the roller.

Figure 13:
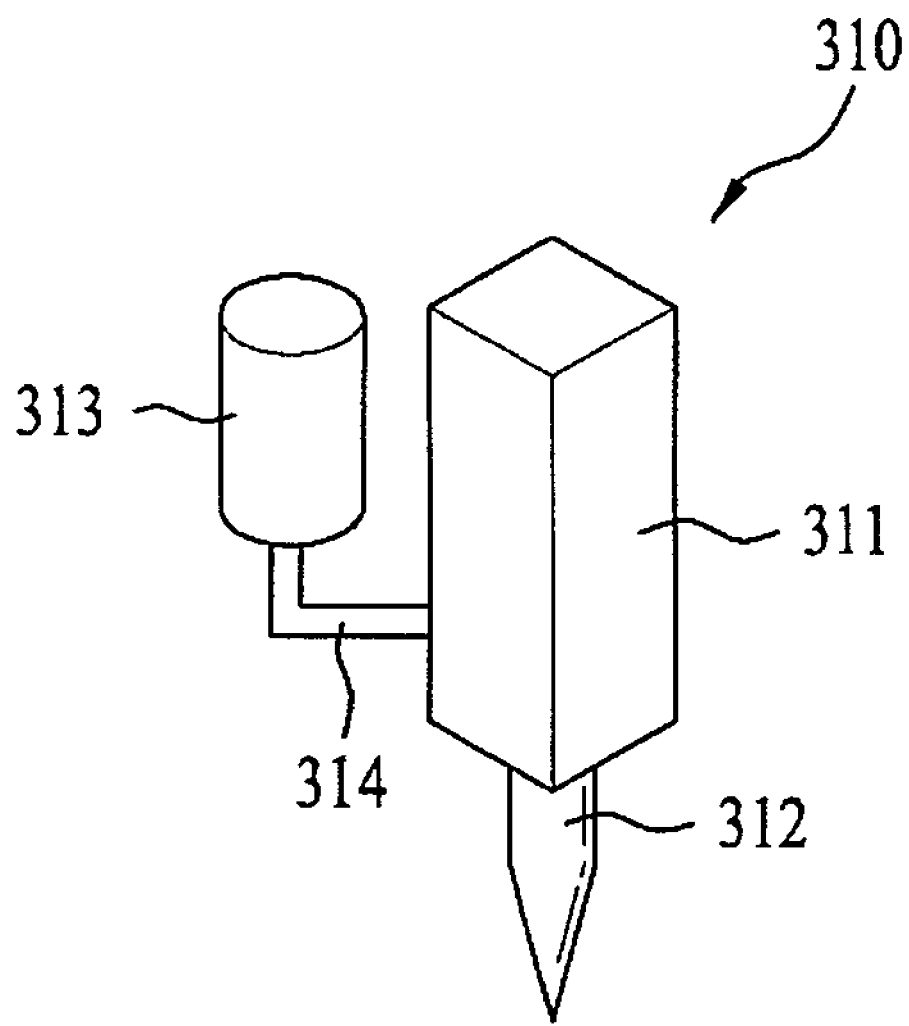
FIG. 13 illustrates a diagram of an inkjet device used in an inkjet step.

The inkjet device 310, shown in FIG. 13, used in the inkjet step\includes a head 311 having liquid held therein, a dispensing unit 312 of the liquid, a tank 313 for supplying the liquid, and a pipe 314 connecting the tank to the head for supply of the liquid. The inkjet device 310 includes a control unit (not shown), and an optical unit (not shown) for sensing a position of the inkjet device 310 on the substrate, and controlling whether the liquid is dispensed or not, and if dispensed, an amount of the liquid to be dispensed.

The inkjet device 310 is used for formation of the alignment film 204 or formation of the column spacer 220.

For an example, in the formation of the alignment film 204 by using the inkjet device 310, a nozzle on the head 311 is opened to dispense the alignment film material, such as PI (Polyimide), at a predetermined position of the color filter array substrate 400 having the color filter array formed thereon. In this instance, when the nozzle on the head 311 passes the width direction line of the black matrix layer (a portion opposite to the gate line) on the color filter array substrate 400, the nozzle on the head 311 is closed.

When the column spacer 220 is formed by using the inkjet device 310, the nozzle on the head 311 is opened at a predetermined position over the alignment film groove having no alignment film formed thereon, and dispenses a predetermined amount of liquid of the column spacer. In this instance, a material of the column spacer 220 is in a liquid state in the inkjet device 310, and cured fully through two steps of curing of a preliminary curing, and final curing after the dispensing.

The liquid for forming the column spacer 220 includes materials for constituting the column spacer, such as components of photoinitiator, theremoinitiator, reactive monomer (photoreactive monomer, thermoreactive monomer, monomer having both the photoreactivity and thermoreactivity, and adhesion promoter. The components are main components of the material for forming the column spacer, to which non-reactive, and volatile solution may be added for adjustment of viscosity in the head of the inkjet device.

If the column spacer 220 contains ball spacers, the ball spacers are contained in the liquid in a form of fine particles for dispensing through the head 311 together with the liquid.

The photoinitiator and the thermoinitiator are different from each other in mechanism of initiation of a reaction, and are adjusted in a range of 0.5~2 wt % in composition of the liquid of the column spacer. The adhesion promoter has a range of 1~10 wt % in the composition of the liquid of the column spacer. The rest of the composition is the reactive monomer of the composition of which varies with the type of the column spacer.

The reactive monomer of a first type of column spacer consists of photoreactive acryl monomer 30~60 wt %, thermoreactive epoxy monomer 40~70 wt %, and monomer having both photoreactivity and thermoreactivity, oligomer, or polymer 5~15 wt %.

The reactive monomer of a second type of column spacer consists of spontaneous reaction type photoreactive acryl monomer 5~10 wt %, photoreactive acryl monomer 40~60 wt %, thermoreactive epoxy monomer 40~70 wt %, and monomer having both photoreactivity and thermoreactivity, oligomer, or polymer 5~15 wt %.

The photoinitiator in the material of the first or second type column spacer may comprise Irgacure-369 (chemical formula 1), TPA (chemical formula 2), and Irgacure-907 (chemical formula 3).

[Chemical Formula 1]

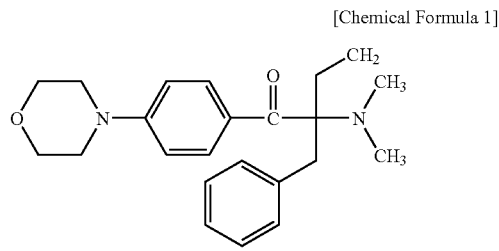

[Chemical Formula 2]

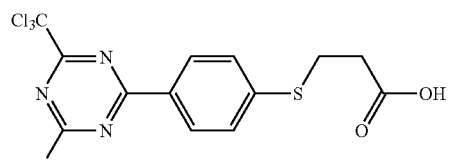

[Chemical Formula 3]

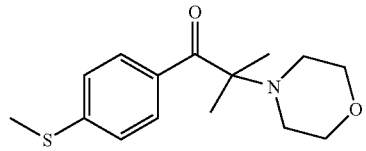

The thermoinitiator may comprise AIBN (chemical formula 4).

[Chemical Formula 4]

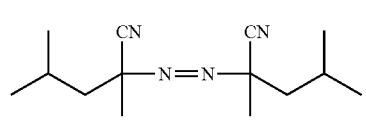

The adhesion promoter may comprise a silane coupling agent.

[Chemical Formula 5]

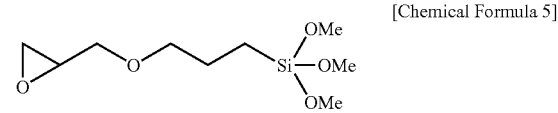

The photoreactive acryl monomer, may comprise a diacrylate monomer (chemical formulae 6, and 7).

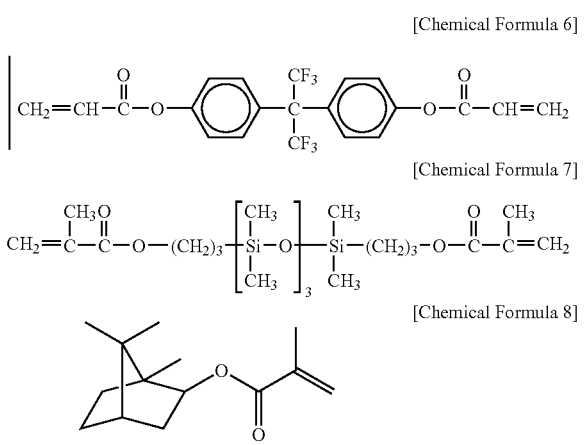

[Chemical Formula 6]

[Chemical Formula 7]

[Chemical Formula 8]

As the spontaneous reactive type acryl monomer, there is stilbene (chemical formula 9).

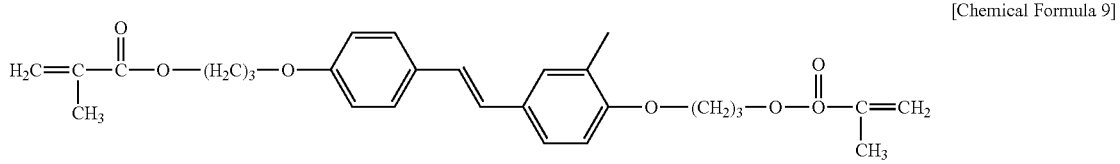

[Chemical Formula 9]

In addition, components may include a monomer having photoreactivity and thermoreactivity (chemical formula 10), or a oligomer or polymer (chemical formula 11) (k, l, m, and n: which are integers greater than unity).

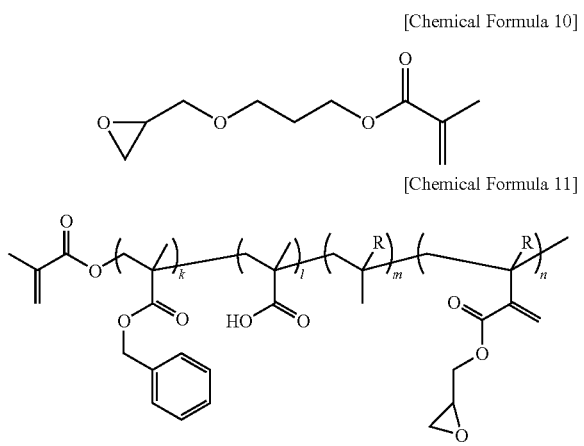

[Chemical Formula 10]

[Chemical Formula 11]

The thermoreactive type epoxy monomer may have the following chemical formula 12.

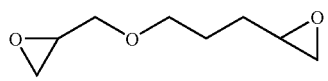

Figure 14:
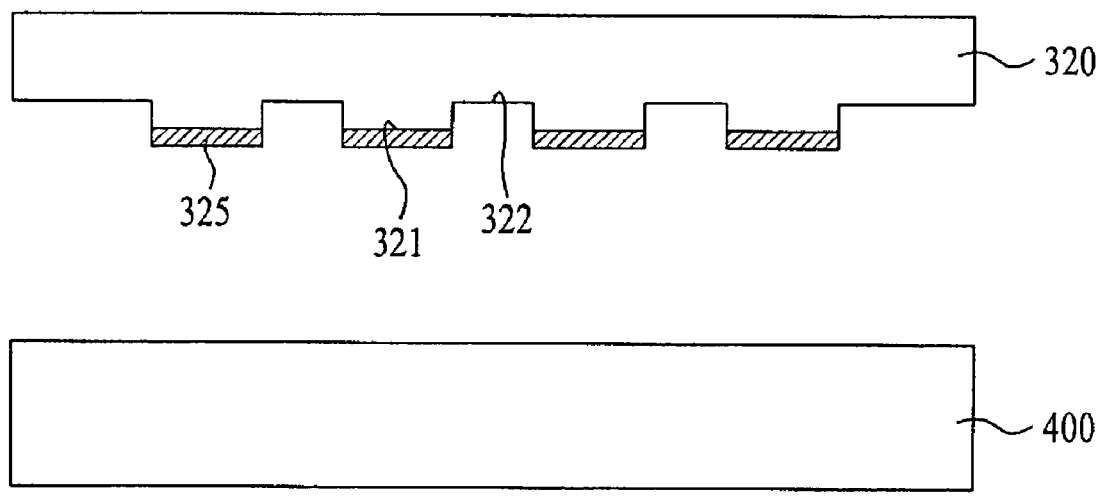
FIG. 14 illustrates a section of an offset printer for printing column spacers or an alignment film.

FIG. 14 illustrates a section of an offset printer for printing column spacers or an alignment film in accordance with a preferred embodiment of the present invention.

The alignment film can be formed by the offset printing. That is, the pattern 321 is relieved by carving the other portion 322 in the substrate 320. Printing material 325 is applied only to the relieved portion, and the relieved and carved surfaces of the substrate are aligned with a surface of the color filter array substrate 400 to be printed thereon, and the printing material applied to the relived portion is printed on the surface of the color filter array substrate 400.

In this aspect, the same process may be applied to the surface of the thin film transistor substrate (the first substrate having thin film transistor array formed thereon) opposite to the color filter array substrate.

Figure 15:
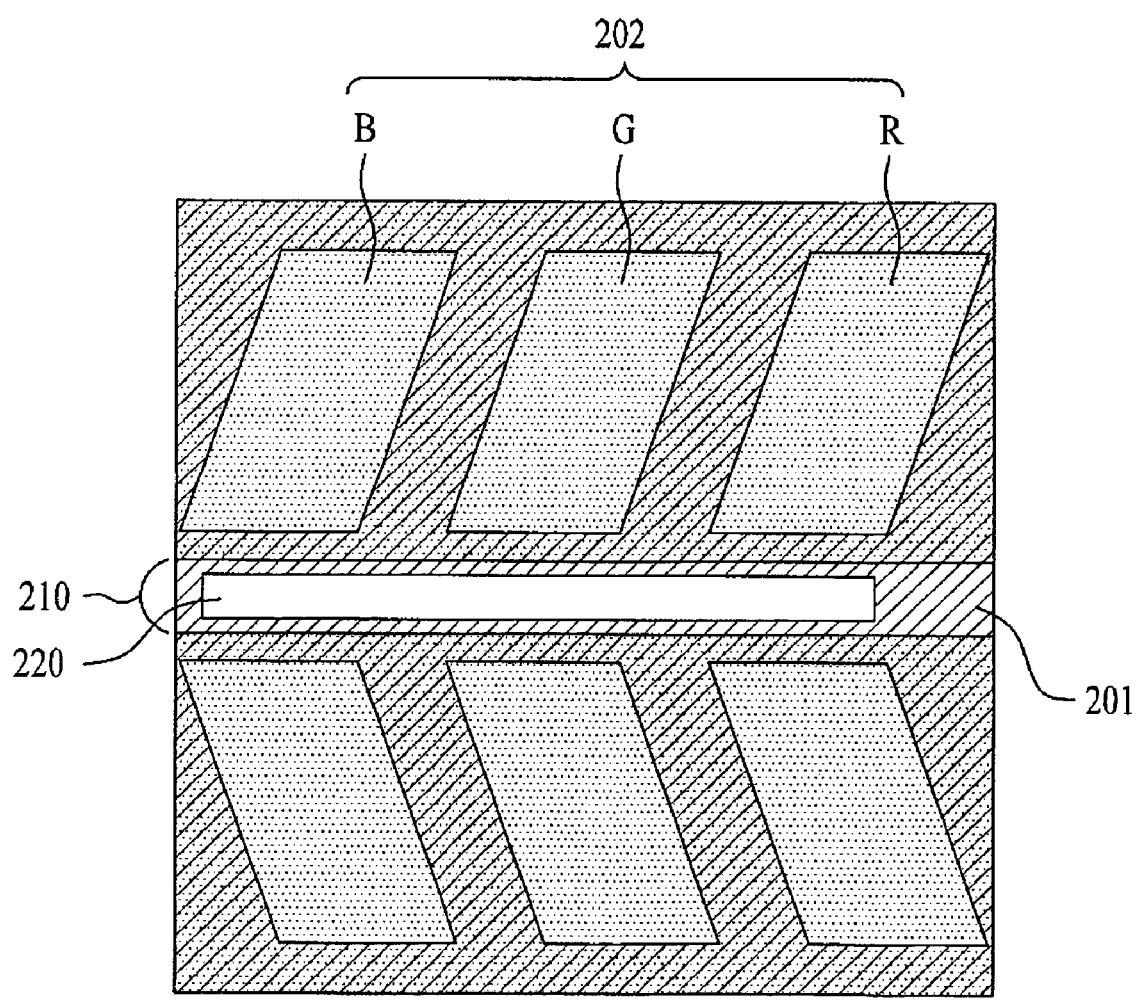
FIG. 15 illustrates a plan view of a liquid crystal display device in accordance with a first embodiment.

Referring to FIG. 15, the alignment film 204 has the alignment film groove 210 in every four width direction lines (a portion opposite to the gate line) of the black matrix layer 201, or every 5~10 width direction lines of the black matrix layer. The column spacer is formed in intervals of two pixel units (one pixel is one set having each one of R, G, B sub-pixels). The width of the alignment film groove 210 is limited to a width direction line width of the black matrix layer 201. For an example, if the width direction line width of the black matrix layer is 140 μm, the width of the alignment film groove 210 is 100 μm. Distribution of the alignment film grooves 210 is varied with a size and resolution of the panel design. The alignment film 204 is formed on the color filter array substrate 400.

The column spacer 220 in accordance with the first preferred embodiment of the present invention is formed to have a rectangular shape spaced a predetermined distance from opposite edges toward a center of the alignment film groove 210. A length direction length of the column spacer 220 is limited to the width of the alignment film groove 210. If the alignment film groove 210 has a width of 100 μm, the rectangular shape of the column spacer 220 has a length direction length of 40~80 μm, and a width direction length of 50~300 μm. Though the figures can vary with the resolution and the size of the liquid crystal panel, the column spacer 220 is formed paying attention so that no column spacer 220 is formed on the pixel region thus preventing loss of aperture.

Thus, because the column spacer is formed after the alignment film is formed, and the substrates are bonded before full curing of the column spacer, such that the column spacer at a top surface thereof is brought into contact with an opposite substrate at a time the column spacer has a certain degree of fluidity, and cured by the heat treatment, adhesion to the opposite substrate becomes better.

Figure 16:
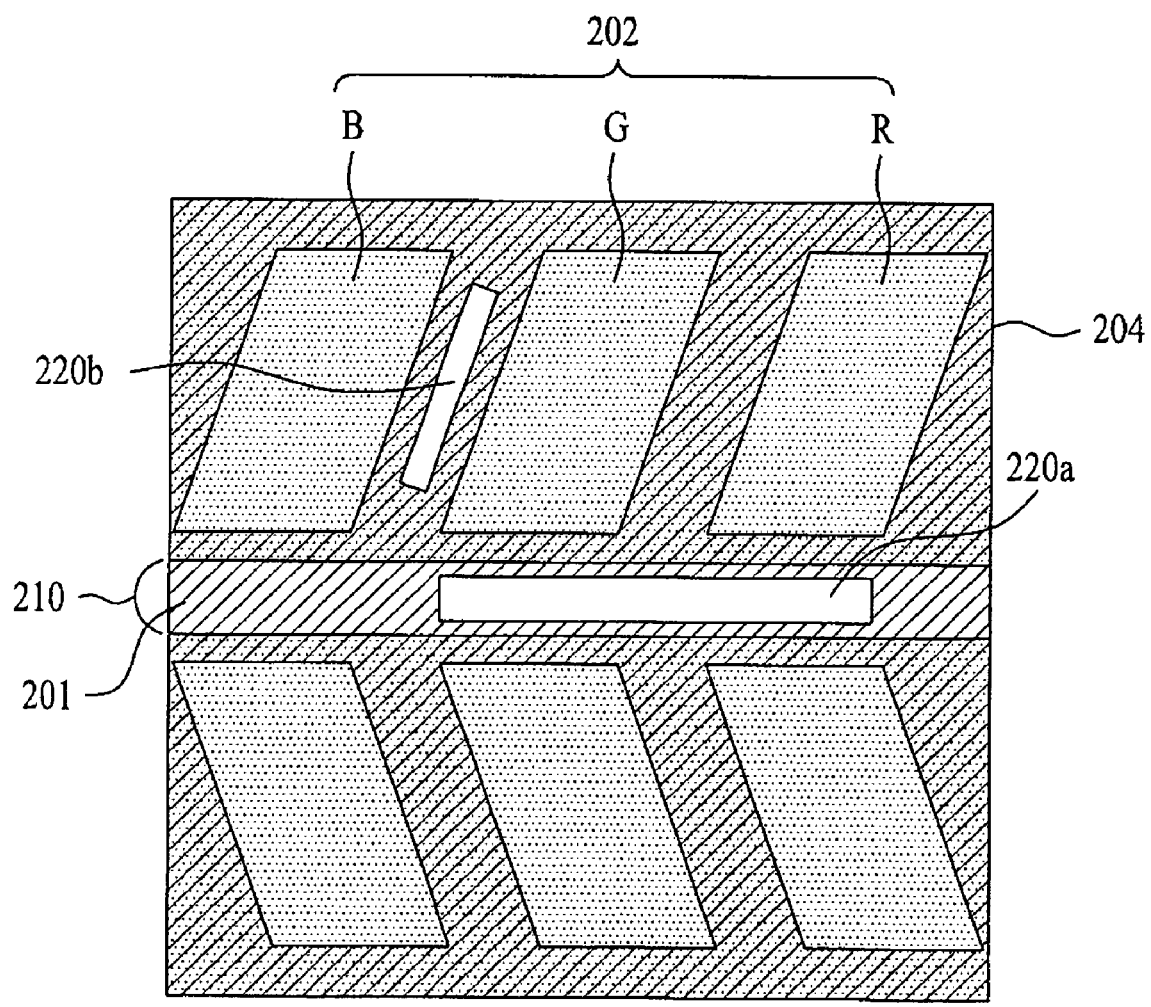
FIG. 16 illustrates a plan view of a liquid crystal display device in accordance with a second embodiment.

Referring to FIG. 16, the liquid crystal display device in accordance with a second embodiment includes a first column spacer 220a at a position of the column spacer in the first embodiment, and a second column spacer 220b at a position opposite to the data line, to have two column spacers at different positions. The column spacer 220a is formed in the alignment film groove 210 where no alignment film 204 is formed therein, and the second column spacer 220b is formed on the alignment film 204. FIG. 15 illustrates the column spacer 220 formed on the alignment film because a width of a length direction line (in a slightly oblique direction). If resolution of the apparatus used in formation of the column spacer permits, the alignment film on the black matrix layer opposite to the data line may also be removed, to form an alignment film groove.

In the second embodiment, the first column spacer opposite to the gate line is formed at intervals of the column spacers in the first embodiment, and the second column spacer 220b opposite to the data line is positioned at every 10~30 pixel units. This may vary with a size and resolution of a panel being designed. For an example, the rectangular section of the first column spacer 220a may have a 40~80 μm height, and a 50~300 μm width, and the rectangular section of the second column spacer 220b may have a 10~30 μm height, and a 50~100 μm width.

Also in the second embodiment, the first and second column spacers 220a, and 220b are bonded to an opposite substrate before full curing of the first, and second column spacers 220a, and 220b, such that the first, and second column spacers 220a, and 220b are bonded with the opposite substrate with a certain degree of fluidity, to improve adherence between the first, and second column spacers 220a, and 220b and the opposite substrate (the first substrate 100).

Figure 17A:
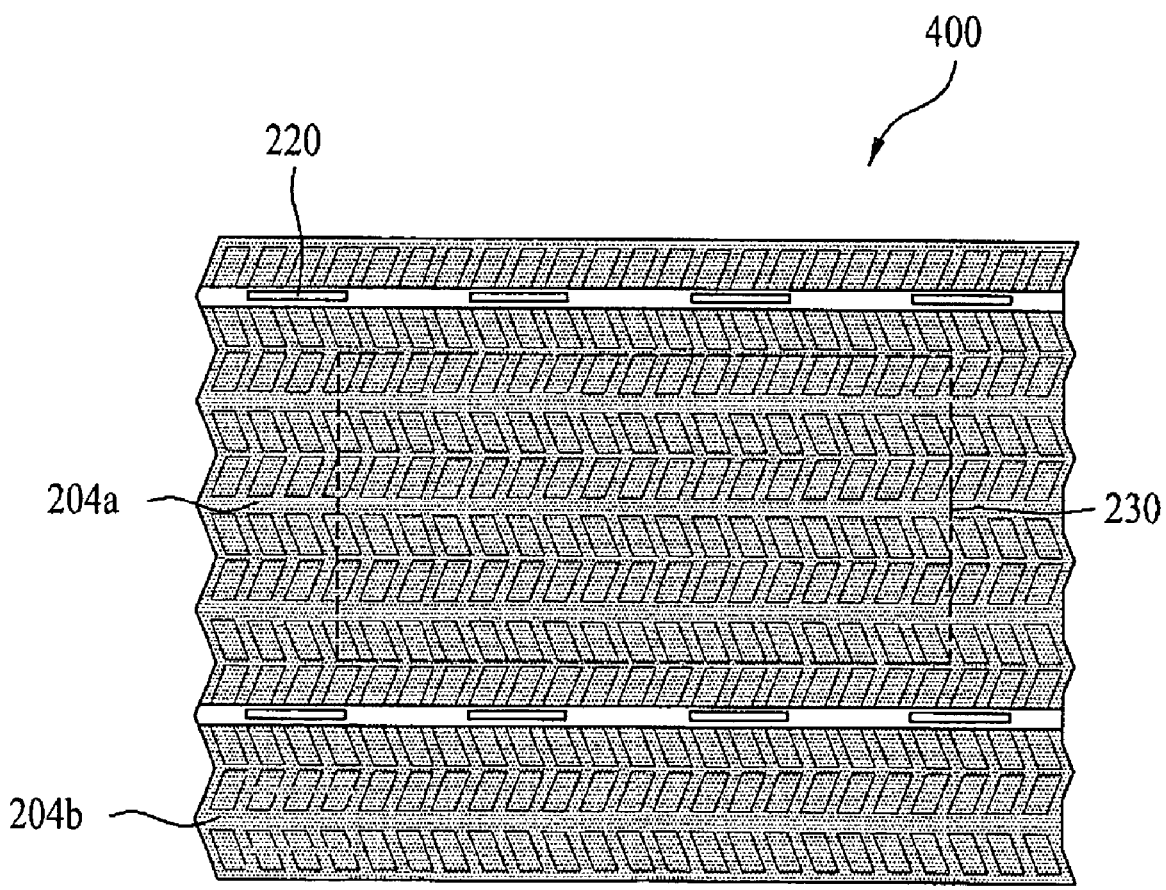
FIGS. 17A and 17B illustrate plan views each showing a method for injecting liquid crystals.
Figure 17B:
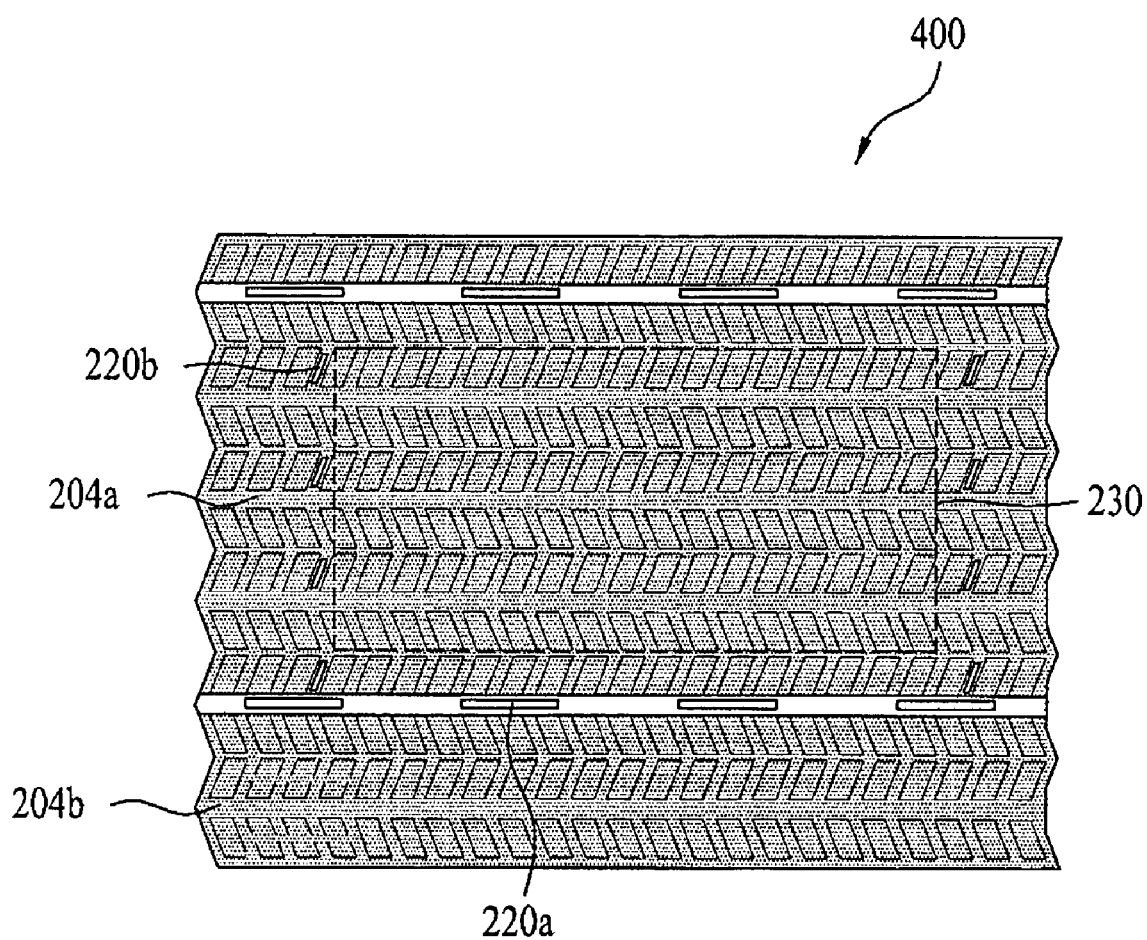

Referring to FIGS. 17A and 17B, the liquid crystal display device in accordance with the first embodiment of the present invention has the liquid crystals 230 dispensed on a central portion of the alignment film 204a, and 204b between the alignment film grooves 210. This provides for inverting and bonding an opposite substrate (the first substrate) after the dispensing of the liquid crystals, such that the curing of the column spacers 220 may progress during the liquid crystals spread, to cause the adherence of the substrates. In this instance, the alignment films 204a, and 204b between the alignment film grooves 210 serve as a kind of domain, such that each domain has characteristics of a small panel, to increase resistance against a external stress.

Liquid crystals 230 may be dispensed in regions, where the liquid crystals may be dispensed on the substrate 400 having the color filter array formed thereon, or the liquid crystal can be dispensed on the first substrate 100 having the thin film transistor array formed thereon.

The overcoat layer 203 is disposed over the black matrix layer 201 having the column spacer 220 coated thereon. The overcoat layer 203 is designed to have a surface energy of 50 mN/m for making the coating of the alignment film 204 uniform. After formation of the alignment film 204, the alignment film 204 has a surface energy similar to the overcoat layer 203, and the dispensed liquid crystals 230 have a tendency to stay on the surface of the alignment film 204 owing to molecular orientation by the alignment and an anchoring energy with respect to the liquid crystals.

The column spacer is cured preliminarily by directing the UV beam thereon after formation thereof, with a wavelength of 300~400 μm and at an intensity of 50~80 mW/cm$^2$ for 150~240 seconds~400 nm depending on kinds of reactors of the column spacer material. When a UV beam with a wavelength in the vicinity of 350 nm is used, the intensity is lowered to, for example, 5~20 mW/cm2, and the directing time period is increased, for example, longer than 3 minutes.

In order to prevent the column spacer from reacting with the liquid crystals, and e in the panel in a successive bonding step, the photo-curing is pereformed to a level at which the column spacer has no fluidity, and becomes soft when heated.

The intensity of the UV beam and the curing time period are fixed in the photo-curing step such that a glass transition temperature (Tg) of molecules of the column spacer is between 50° C.~35° C. That is, the column spacer becomes hard enough at a room temperature enough to maintain a cell gap with respect with an opposite substrate, and not mixed with the liquid crystals. The cell gap is fixed based on a height of the column spacer and a dispensed amount of the liquid crystals.

Figure 18:
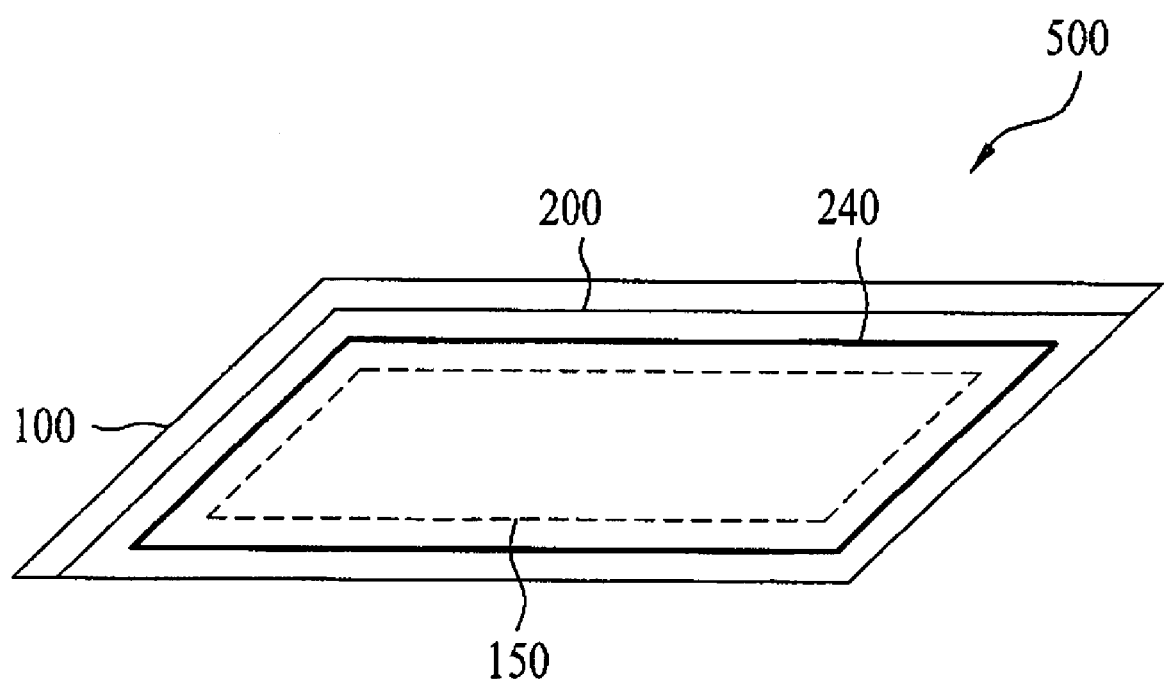
FIG. 18 illustrates a perspective view of a thermal curing step after bonding in a cell fabrication step in a liquid crystal display device.

Referring to FIG. 18, after bonding the first, and second substrates 100, and 200 of the liquid crystal display device of the present invention into a liquid crystal panel 500, the thermal curing step, another curing step of the column spacer is performed at the same time as a step of curing the seal pattern 240 on the non-display region (an outside of a dashed line).

The thermal curing step may include two steps. In a first step, the liquid crystal panel is left for 3~5 minutes at 50° C., so that molecules of the column spacer have an adhesive property, and in a second step, the substrate is heated for 30~50 minutes at 70° C.~120° C., to complete the thermal curing reaction.

In the thermal curing step when the final curing of the column spacer occurs, the molecules of the column spacer may have no fluidity as cross linking of the molecules may have already been already been performed formed in the photo-curing step, but has an increased molecular adhesive property with respect to the opposite substrate such that the column spacer adheres to the first, and second substrates by an additional cross linking reaction caused by heating. The final curing of the column spacer may be made by thermal curing the polymer component which is 30~50 wt % of the column spacer composition.

Figure 19:
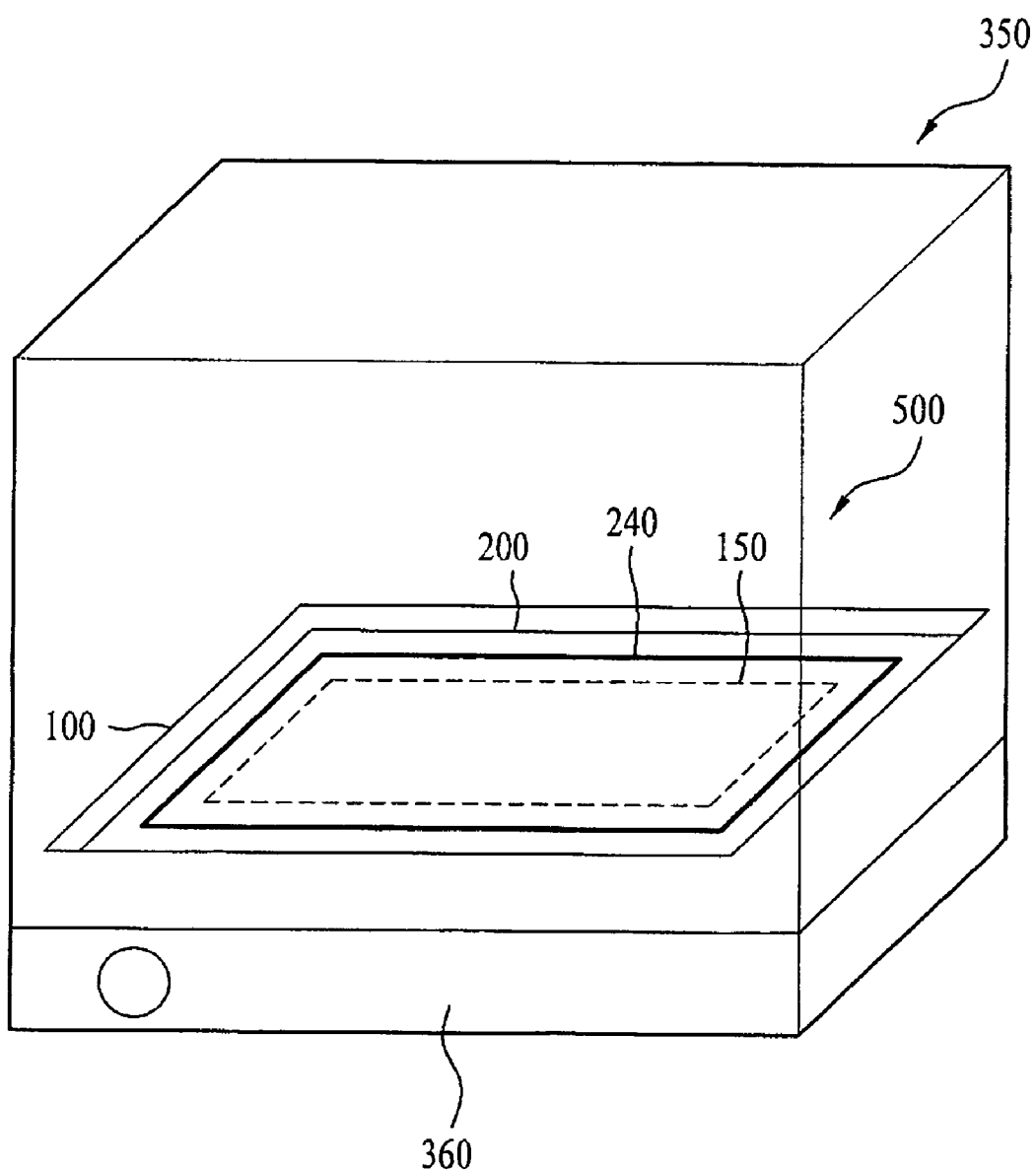
FIG. 19 illustrates a perspective view of an apparatus used in the thermal curing step in FIG. 18.

Referring to FIG. 19, when it is intended to cure the liquid crystal panel thermally, the liquid crystal panel is placed on a support tray, and the support tray 350 is put into an oven 360, for heat treatment. In order to heat the liquid crystal panel 500 while preventing the liquid crystal panel from glass sagging during the thermal curing reaction in which curing of the seal pattern and the final curing of the column spacer are progressed, a support tray having no holes, or fine holes are used.

In the liquid crystal display device, after providing the first substrate and the second substrate having the thin film transistor array and the color filter array formed thereon respectively, the divided alignment film is formed having grooves in predetermined portions of the first and second substrates in the cell fabrication step, and the column spacer is formed in the grooves of the divided alignment films.

Therefore, by forming the column spacer after formation of the alignment film, bonding the substrates after preliminary curing of the column spacer, and curing the column spacer by thermal curing in a seal pattern fabrication step in the bonding step, since the column spacer is bonded with an opposite substrate before the column spacer is cured fully, and the full curing of the column spacer is made in the seal pattern curing step after the bonding, the adhesion of the column spacer to an opposite substrate is strong. Accordingly, since the column spacer is bonded to the upper and lower substrates, the upper and lower substrates may not be distorted even if an external force is applied thereto, such as shrinkage of the film, rubbing with a finger, or the like, such that the two substrates resists the force as one body, causing less deformation of the liquid crystal panel and an inside of the liquid crystal panel.

Accordingly, relative movement of the first or second substrate with respect to an opposite substrate caused by a touching action, such as rubbing on the liquid crystal panel is reduced. Defects caused by touch, and the non-uniform cell gap caused by shift may be prevented.

By forming the column spacer after formation of the alignment film, bonding the substrates after preliminary curing of the column spacer, and curing the column spacer by thermal curing in a seal pattern fabrication step in the bonding step, since the column spacer is bonded with an opposite substrate before the column spacer is cured fully, and the full curing of the column spacer is made in the seal pattern curing step after the bonding, the adhesion of the column spacer to an opposite substrate is strong.

Since the column spacer is bonded to the first and second substrates, the first and second substrates are not distorted even if an external force is applied thereto, such as shrinkage of the film, or rubbing with a finger, such that the two substrates resist the force as one body, causing less relative movement between the first, and second substrates.

Even if a large sized panel shows characteristics of a small sized panel depending on a size of a domain (alignment film coated divided regions) bonded by the column spacers adhered to the substrates, resistance against an external force becomes higher. That is, taking an alignment film region divided by the alignment film groove as a domain, the large sized panel shows characteristics of a small sized panel with an area of the domain.

Since the column spacer holds the upper and lower substrates together, deformation of the substrates is reduced, to reduce leakage of light, and the problem of the luminance non-uniformity in a black state is improved in the case of large screen.

The thermal expansion of the liquid crystals and the substrates, or the increased cell gap at a lower portion of the liquid crystal panel coming from excessive injection of the liquid crystals can be reduced by a structure in which two substrates are stuck together fully.

The printing and rubbing of the alignment film before formation of the column spacer reduces damage to rubbing cloth coming from projections, such as the column spacers, and improves uniformity of the rubbing, to improve liquid crystal orientation.

The omission of development of the column spacer saves a material cost, and results in accurate column spacer critical dimensions, and height uniformity.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
a first substrate, and a second substrate disposed opposing each other;
gate lines and data lines on the first substrate disposed perpendicular to each other to define pixel regions;
a black matrix layer on the second substrate disposed opposite to regions on the first substrate excluding the pixel regions;
a color filter layer on the second substrate;
an overcoat layer on an entire surface of the second substrate including the black matrix layer and the color filter layer;
a first alignment film on the overcoat layer, the first alignment film having a first alignment film groove in the first alignment film corresponding to a predetermined portion of the black matrix layer;
a first spacer in the first alignment film groove;
a seal pattern on a non-display region between the first or the second substrate; and
a liquid crystal layer between the first substrate and the second substrate, wherein a width of the first alignment film groove is greater than a diameter of the first spacer.

2. The liquid crystal display device as in claim 1, wherein the first spacer has polygonal column shape.

3. The liquid crystal display device as in claim 1, further comprising a second alignment film on the first substrate.

4. The liquid crystal display device as in claim 3, wherein the second alignment film includes a second alignment film groove disposed opposite to the first alignment film groove.

5. The liquid crystal display device as in claim 1, further comprising a thin film transistor at each cross of the gate lines and the data lines; and
a pixel electrode on each of the pixel regions.

6. The liquid crystal display device as in claim 5, further comprising a common electrode formed alternately with the pixel electrode in the pixel region.

7. The liquid crystal display device as in claim 1, wherein the first alignment film groove is formed so as to be corresponding to a predetermined region of the gate line.

8. The liquid crystal display device as in claim 1, wherein the first alignment film groove is formed so as to be corresponding to a predetermined region of the data line.

9. The liquid crystal display device as in claim 1, further comprising a second spacer on the first alignment film, the second spacer being formed so as to be disposed opposite a region excluding the pixel region.

10. The liquid crystal display device as in claim 1, further comprising a common electrode layer on an entire surface of the overcoat layer.

11. A method for fabricating a liquid crystal display device comprising:
providing a first substrate and a second substrate each having a display region and a non-display region;
forming a thin film transistor array on the first substrate;
forming a color filter array on the second substrate;
forming a first alignment film on the second substrate, the first alignment film having a predetermined portion removed therefrom to form a first alignment film groove;
dispensing liquid crystals on the first substrate in the display region;
forming a spacer at a portion of the first alignment film groove on the second substrate;
forming a seal pattern on the non-display region of the first or the second substrate;
inverting the second substrate;
pressing surfaces of the first substrate and the second substrate together, so as to bond the first substrate and the second substrate; and
curing the seal pattern and the spacer thermally at the same time, after bonding the first substrate and the second substrate.

12. The method as in claim 11, wherein the spacer is formed by inkjet printing.

13. The method as in claim 11, wherein the first alignment film is formed by inkjet printing.

14. The method as in claim 11, further comprising forming a second alignment film on the first substrate.

15. The method as in claim 11, wherein the thin film transistor array includes;
gate lines and data lines formed on the first substrate perpendicular to each other, to define pixel regions,
a thin film transistor at each cross of the gate lines and the data lines; and
a pixel electrode on each of the pixel regions.

16. The method as in claim 15, wherein the first alignment film groove is formed in a region disposed so as to exclude the pixel region.

17. The method as in claim 16, wherein the first alignment film groove is formed so as to be disposed opposite to the gate line.

18. The method as in claim 16, wherein the first alignment film groove is formed so as to be disposed opposite to the data line.

19. The method as in claim 15, further comprising a second spacer on a portion of the first alignment film having no the first alignment film groove, the second spacer being oriented so as to be disposed opposite to a region excluding the pixel region.

20. The method as in claim 15, wherein the color filter array includes;
    a black matrix layer formed on the second substrate to cover regions excluding the pixel regions, and
    a color filter layer on the pixel region.

21. The method as in claim 20, further comprising a common electrode layer on an entire surface of the second substrate including the black matrix layer, and the color filter layer.

22. The method as in claim 20, further comprising an overcoat layer on an entire surface of the second substrate including the black matrix layer, and the color filter layer.

23. The method as in claim 20, wherein the first alignment film groove is formed opposite to the black matrix layer.

* * * * *